United States Patent
Kapp et al.

(10) Patent No.: US 12,124,448 B2
(45) Date of Patent: Oct. 22, 2024

(54) USING TEMPORARY TABLES TO STORE GRAPH ALGORITHM RESULTS FOR A RELATIONAL DATABASE MANAGEMENT SYSTEM

(71) Applicant: Oracle International Corporation, Redwood Shores, CA (US)

(72) Inventors: Hugo Kapp, Zurich (CH); Laurent Daynes, Saint-Ismier (FR); Vlad Ioan Haprian, Zurich (CH); Jean-Pierre Lozi, Zurich (CH); Zhen Hua Liu, San Mateo, CA (US); Marco Arnaboldi, Zurich (CH); Sabina Petride, Tracy, CA (US); Andrew Witkowski, Foster City, CA (US); Hassan Chafi, San Mateo, CA (US); Sungpack Hong, Palo Alto, CA (US)

(73) Assignee: Oracle International Corporation

( * ) Notice: Subject to any disclaimer, the term of this patent is extended or adjusted under 35 U.S.C. 154(b) by 0 days.

(21) Appl. No.: 17/585,146

(22) Filed: Jan. 26, 2022

(65) Prior Publication Data

US 2023/0267120 A1    Aug. 24, 2023

(51) Int. Cl.
*G06F 16/00* (2019.01)
*G06F 16/2453* (2019.01)

(52) U.S. Cl.
CPC .............. *G06F 16/24539* (2019.01)

(58) Field of Classification Search
CPC ......... G06F 16/24539; G06F 16/24545; G06F 16/2379; G06F 16/24537
See application file for complete search history.

(56) References Cited

U.S. PATENT DOCUMENTS

| | | |
|---|---|---|
| 5,379,419 A | 1/1995 | Heffernan et al. |
| 6,081,801 A * | 6/2000 | Cochrane ............... G06Q 10/04 |
| 8,176,265 B2 | 5/2012 | Coon |

(Continued)

FOREIGN PATENT DOCUMENTS

CN    107807983 A  *  3/2018   ............ G06F 16/27

OTHER PUBLICATIONS

Lahorani, U.S. Appl. No. 15/268,519, filed Sep. 16, 2016, Office Action, dated Oct. 31, 2018.

(Continued)

*Primary Examiner* — Leslie Wong
(74) *Attorney, Agent, or Firm* — Hickman Becker Bingham Ledesma LLP

(57) ABSTRACT

An RDBMS specifies a graph algorithm function (GAF) that takes a graph object as input and returns a logical graph object as output. GAFs are used within graph queries to compute temporary and output properties ("GAF-computed properties"), which are live for the duration of the query cursor execution. GAF-computed output properties are accessible in the enclosing graph pattern matching query as though they were part of the input graph object of the GAF. Temporary cursor-duration tables are generated for the query cursor during compilation of a graph query that includes a GAF, and are used to store the GAF-computed properties. Each temporary table corresponds to one of the primary tables of the input graph, and includes, as a foreign key, primary key information from the corresponding primary table.

34 Claims, 23 Drawing Sheets

(56) References Cited

U.S. PATENT DOCUMENTS

| | | | |
|---|---|---|---|
| 8,660,985 | B2 | 2/2014 | Wang |
| 9,116,738 | B2* | 8/2015 | Jacob .................. G06F 8/314 |
| 9,122,513 | B2* | 9/2015 | Jacob .................. G06F 9/4881 |
| 9,971,808 | B2 | 5/2018 | Kamath |
| 10,268,610 | B1 | 4/2019 | McKenney |
| 10,452,655 | B2 | 10/2019 | Lahorani et al. |
| 10,984,046 | B2* | 4/2021 | Das ..................... G06F 16/25 |
| 11,514,219 | B1 | 11/2022 | Abo Foul et al. |
| 11,704,313 | B1* | 7/2023 | Andrade ........... G06F 16/24535 707/714 |
| 2006/0101001 | A1 | 5/2006 | Lindsay et al. |
| 2007/0283356 | A1 | 12/2007 | Du |
| 2008/0184197 | A1 | 7/2008 | Dobbins et al. |
| 2010/0088666 | A1 | 4/2010 | Box et al. |
| 2011/0047364 | A1 | 2/2011 | Koju |
| 2011/0119245 | A1* | 5/2011 | Sargeant ............ G06F 16/9024 707/706 |
| 2011/0252033 | A1 | 10/2011 | Narang |
| 2011/0267351 | A1 | 11/2011 | Curbera |
| 2011/0270861 | A1 | 11/2011 | Arshavsky et al. |
| 2013/0275365 | A1 | 10/2013 | Wang |
| 2014/0019490 | A1 | 1/2014 | Roy et al. |
| 2014/0032617 | A1* | 1/2014 | Stanfill .................. G06F 16/25 707/809 |
| 2014/0136553 | A1* | 5/2014 | Jacob ................. G06F 16/9024 707/754 |
| 2014/0136555 | A1* | 5/2014 | Jacob ................. G06F 16/9024 707/754 |
| 2014/0137129 | A1* | 5/2014 | Jacob .................... G06F 9/46 718/103 |
| 2014/0137130 | A1* | 5/2014 | Jacob .................... G06F 9/46 718/103 |
| 2015/0026158 | A1* | 1/2015 | Jin ................... G06F 16/90335 707/769 |
| 2016/0063132 | A1 | 3/2016 | Chen et al. |
| 2016/0103931 | A1 | 4/2016 | Appavu |
| 2016/0117358 | A1 | 4/2016 | Schmid et al. |
| 2016/0179883 | A1 | 6/2016 | Chen |
| 2016/0188656 | A1 | 6/2016 | Ekanadham et al. |
| 2016/0342708 | A1 | 11/2016 | Fokoue-Nkoutche et al. |
| 2016/0378751 | A1 | 12/2016 | Kamath |
| 2016/0378754 | A1 | 12/2016 | Kamath |
| 2017/0046388 | A1 | 2/2017 | Kirk et al. |
| 2017/0068748 | A1 | 3/2017 | Hu et al. |
| 2017/0091246 | A1 | 3/2017 | Risvik |
| 2017/0116266 | A1 | 4/2017 | Lahorani |
| 2018/0067987 | A1 | 3/2018 | Kang et al. |
| 2018/0096035 | A1* | 4/2018 | Kreutzer ........... G06F 16/24549 |
| 2018/0218088 | A1 | 8/2018 | Fischer et al. |
| 2018/0293329 | A1 | 10/2018 | Yanagisawa |
| 2018/0329958 | A1 | 11/2018 | Choudhury |
| 2019/0121810 | A1 | 4/2019 | Zhuang |
| 2019/0205480 | A1 | 7/2019 | Zhang et al. |
| 2019/0213356 | A1 | 7/2019 | Vagujhelyi et al. |
| 2019/0311060 | A1 | 10/2019 | Bross et al. |
| 2020/0364268 | A1 | 11/2020 | Xu et al. |
| 2021/0034615 | A1 | 2/2021 | Chen et al. |
| 2021/0064660 | A1 | 3/2021 | Xu et al. |
| 2021/0149854 | A1 | 5/2021 | Barde et al. |
| 2021/0224235 | A1 | 7/2021 | Arnaboldi et al. |
| 2021/0256063 | A1 | 8/2021 | Kasperovics et al. |
| 2022/0129451 | A1 | 4/2022 | Haprian et al. |
| 2022/0129461 | A1 | 4/2022 | Haprian et al. |
| 2022/0129465 | A1 | 4/2022 | Haprian et al. |

OTHER PUBLICATIONS

Lahorani, U.S. Appl. No. 15/268,519, filed Sep. 16, 2016, Notice of Allowance, dated May 23, 2019.
Haprian, U.S. Appl. No. 17/080,719, filed Oct. 26, 2020, Non-Final Rejection, dated Dec. 14, 2021.
Haprian, U.S. Appl. No. 17/080,698, filed Oct. 26, 2020, Non-Final Rejection, dated Dec. 24, 2021.
Arnaboldi, U.S. Appl. No. 16/747,827, filed Jan. 21, 2020, Office Action, dated Apr. 21, 2021.
Arnaboldi, U.S. Appl. No. 16/747,827, filed Jan. 21, 2020, Notice of Allowance, dated Jun. 9, 2021.
Haprian, U.S. Appl. No. 17/080,719, filed Oct. 26, 2020, Notice of Allowance and Fees Due, dated Oct. 20, 2022.
Haprian, U.S. Appl. No. 17/080,719, filed Oct. 26, 2020, Notice of Allowance and Fees Due, dated Aug. 11, 2022.
Haprian, U.S. Appl. No. 17/080,700, filed Oct. 26, 2020, Non-Final Rejection, dated Sep. 9, 2022.
Haprian, U.S. Appl. No. 17/080,698, filed Oct. 26, 2020, Notice of Allowance and Fees Due, dated Sep. 14, 2022.
Neo4j Graph Database Platform, "Cypher Query Language", https://neo4j.com/developer/cypher/, dated Nov. 4, 2020, 7 pages.
Amazon Neptune, "Overview" https://aws.amazon.com/neptune/, last viewed on Nov. 4, 2020, 20 pages.
Annamalai et al., "PGQL Introduction and Deep Dive", Product Management, Oracle, Jul. 30, 2020, 45 pages.
Apache TinkerPop, "The Gremlin Graph Traversal Machine and Language", tinkerpop.apache.org/gremlin.html, last viewed on Nov. 4, 2020, 6 pages.
Databricks, "Graph Analysis Tutorial with GraphFrames", dated Jul. 21, 2020, https://docs.databricks.com/spark/latest/graph-analysis/graphframes/graph-analysis-tutorial.html, 2 pages.
Deutsch et al., "TigerGraph: A Native MPP Graph Database", Jan. 24, 2019, 28 pages.
Hassan, "Extending In-Memory Relational Database Engines with Native Graph Support", Published in Proceedings of the 21st International Conference on EDBT, https://openproceedings.org/2018/conf/edbt/paper-17.pdf, dated Mar. 2018, 12 pages.
Hong et al., "PGX.D: A Fast Distributed Graph Processing Engine", DOI:http://dx.doi.org/10.1145/2807591.2807620, dated Nov. 2015, Austin TX, USA, 12 pages.
Adam et al., "A Comparison of List Schedules for Parallel Processing Systems", Communications of the ACM 17(12):685-690, Dec. 1974, pp. 685-690.
Michaels, Jan, "Property Graph Data Model—The Proposal", Individual Expert Contribution, dated Jan. 16, 2019, 76 pages.
Zemke, Fred, "Fixed Graph Patterns", ISO/IEC SC32/WG3:ERF-035, dated Sep. 14, 2018, 25 pages.
Neo4j Graph Platform, "What is Neo4j?", https://neo4j.com/, last viewed on Nov. 4, 2020, 14 pages.
Oracle Help Center, "ROWID Pseudocolumn", Database SQL Reference, https://docs.oracle.com/cd/B19306_01/server.102/b14200/pseudocolumns008.htm, dated Nov. 20, 2019, 2 pages.
Padmanabhan, "HDB-Subdue, A Relational Database Approach to Graph Mining and Hierarchical Reduction", Dec. 2005, 99 pages.
PGQL, "Property Graph Query Language", http://pgql-lang.org/, last viewed on Nov. 3, 2020, 5 pages.
Tian et al., "IBM Db2 Graph: Supporting Synergistic and Retrofittable Graph Queries Inside IBM Db2", SIGMOD '20: Proceedings of the 2020 ACM SIGMOD International Conference on Management of Data, Jun. 2020, 15 pages.
TigerGraph, "The Only Scalable Graph Database for the Enterprise", https://www.tigergraph.com/, last viewed on Nov. 4, 2020, 9 pages.
Valiyev, Mahammad, "Graph Storage: How Good is CSR Really?", https://github.com/mehemmedv/DB_Imp_Seminar, dated Dec. 10, 2017, 8 pages.
Wheatman et al., "Packed Compressed Sparse Row: A Dynamic Graph Representation", Computer Science and Artificial Intelligence Laboratory Massachusetts Institute of Technology, https://ieeexplore.ieee.org/abstract/document/8547566, dated 2018, 7 pages.
IBM Knowledge Center, "Row ID Values", https://www.ibm.com/support/knowledgecenter/en/SSEPEK_11.0.0/sqlref/src/tpc/db2z_rowidvalues.html, dated Nov. 20, 2019, 3 pages.
Haprian, U.S. Appl. No. 17/080,698, filed Oct. 26, 2020, Notice of Allowance and Fees Due, dated Dec. 28, 2022.
Haprian, U.S. Appl. No. 17/080,719, filed Oct. 26, 2020, Notice of Allowance and Fees Due, dated Jul. 7, 2022.
Haprian, U.S. Appl. No. 17/080,698, filed Oct. 26, 2020, Final Rejection, dated May 18, 2022.

(56) References Cited

OTHER PUBLICATIONS

Kapp, U.S. Appl. No. 17/584,262, filed Jan. 25, 2022, Non-Final Rejection, dated Jun. 23, 2023.
Haprian, U.S. Appl. No. 17/080,700, filed Oct. 26, 2020, Non-Final Rejection, dated May 25, 2023.
Stoica, Radu-Alexandru, "R2PG-DM: A Directly Mapping Relational Databases to Property Graphs", diss. Master's thesis, Eindhoven Univ. of Technology 2019, https://ceur-ws.org/Vol-2369/short06.pdf, Jul. 2019, 24pgs.
Jindal, Alekh et al. "Graph Analytics Using Vertica Relational Database", 2015 IEEE Intl Conf on Big Data (Big Data), Santa Clara, CA, pp. 1191-1200, doi: 10.1109/BigData.2015.7363873, Oct. 2015, 14pgs.
Hassan, Mohamed S., et al., "Empowering In-Memory Relational Database Engines with Native Graph Processing", arXiv:1709.06715v2, Oct. 12, 2017, 15pgs.
"SAP HANA Graph Reference", SAP HANA Platform 2.0 SPS 04 Document Version: 1.1 dated Oct. 31, 2019, SAP.com, 86 pages.
Kapp, U.S. Appl. No. 17/584,262, filed Jan. 25, 2022, Notice of Allowance and Fees Due, dated Oct. 12, 2023.
Haprian, U.S. Appl. No. 17/080,700, filed Oct. 26, 2020, Notice of Allowance and Fees Due, dated Sep. 21, 2023.
Haprian, U.S. Appl. No. 17/080,700, filed Oct. 26, 2020, Advisory Action, dated Mar. 30, 2023.
Haprian, U.S. Appl. No. 17/080,700, filed Oct. 26, 2020, Final Rejection, dated Jan. 18, 2023.
Wagner et al., "Language Integrated Query (LINQ)", available: https://learn.microsoft.com/en-us/dotnet/csharp/linq/, Dec. 15, 2023.
Ong et al., The SQL++ Query Language: Configurable, Unifying and Semi-structured, available: https://arxiv.org/abs/1405.3631, Dec. 14, 2015.
Hong et al., "Green-Marl: A DSL for Easy and Efficient Graph Analysis", ASPLOS'12 Mar. 3-7, 2012, London, England, UK, 14 pages.
Hölsch et al., "An Algebra and Equivalences to Transform Graph Patterns in Neo4j", available: http://ceur-ws.org/Vol-1558/paper24.pdf.
Benzaken et al., "Language-Integrated Queries: a BOLDR Approach", WWW 2018, Lyon, France, Apr. 23-27, 2018.

\* cited by examiner

```
SELECT *
FROM GRAPH_TABLE (
  g
  MATCH (v IS Person)
  WHERE v.job = 'MANAGER'
  COLUMNS(v.name, v.salary));
```

↑
200

```
SELECT *
FROM GRAPH_TABLE (
  my_algorithm(g, PROPERTY(salary),    ← 212
                                       ← 214
                  PROPERTY(result1), PROPERTY(result2))
  MATCH (v IS Person)
  WHERE v.job = 'MANAGER'
                                       ← 216
  COLUMNS(v.name, v.result1, v.result2));
```

```
-- EXAMPLE GAF SIGNATURE

CREATE FUNCTION my_algorithm(
    g IN PROPERTY_GRAPH,
    salary_GAF IN VERTEX_INPUT_PROPERTY,
    result1_GAF IN VERTEX_OUTPUT_PROPERTY,
    result2_GAF IN VERTEX_OUTPUT_PROPERTY)
RETURNING PROPERTY_GRAPH
GRAPH ALGORITHM USING DBMS_OGA_MY_ALGORITHM
```

- 302 → g IN PROPERTY_GRAPH,
- 304 → salary_GAF IN VERTEX_INPUT_PROPERTY,
- 306 → result1_GAF IN VERTEX_OUTPUT_PROPERTY, result2_GAF IN VERTEX_OUTPUT_PROPERTY)
- 320

```
CREATE PACKAGE DBMS_OGA_MY_ALGORITHM AS
    FUNCTION DESCRIBE(
        salary_GAF  --input
        result1_GAF --output
        result2_GAF --output
        rank        --temporary
    );
    PROCEDURE EXECUTE(. . .);
```

```
SELECT *
FROM GRAPH_TABLE (
    my_algorithm(                                    — 902
        another_algorithm(                           — 904
            g,
                                                     — 906
            PROPERTY(result2)
        ),
        PROPERTY(result1)
    )
    MATCH (v)                                        — 908
    COLUMNS(v.result1, v.result2));
```

↑
900

```
SELECT *
FROM GRAPH_TABLE (
    reader_algorithm(                                — 912
        producer_algorithm(                          — 914
            g,                                       — 916
            output_prop => PROPERTY(inner_result)
        ),
        input_prop => PROPERTY(inner_result),        — 920
        output_prop => PROPERTY(outer_result)
    )
    MATCH (v)                                        — 918
    COLUMNS(v.outer_result));
```

Temporary table 1310

| firstname | lastname | result1_GAF | COMP_ID | TMP1 |

PRIMARY KEY, FOREIGN KEY to primary table

Primary table 1300

| firstname | lastname | age | SSN | job |

PRIMARY KEY

FIG. 13

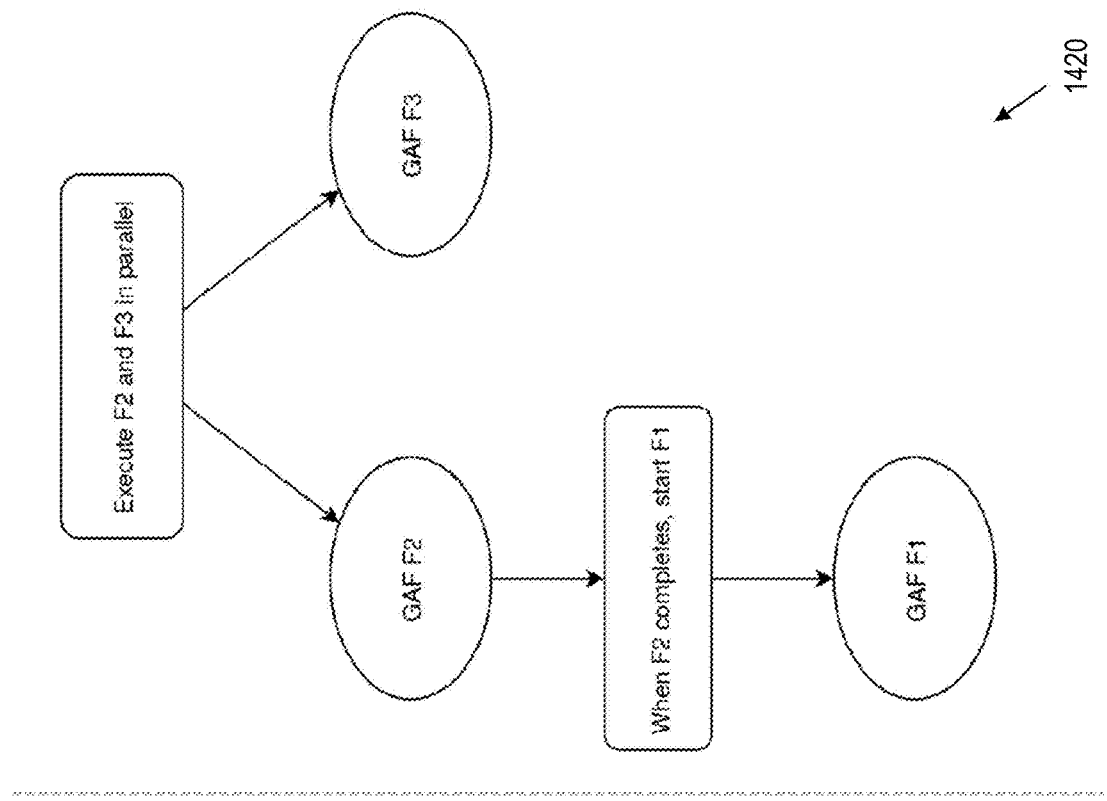
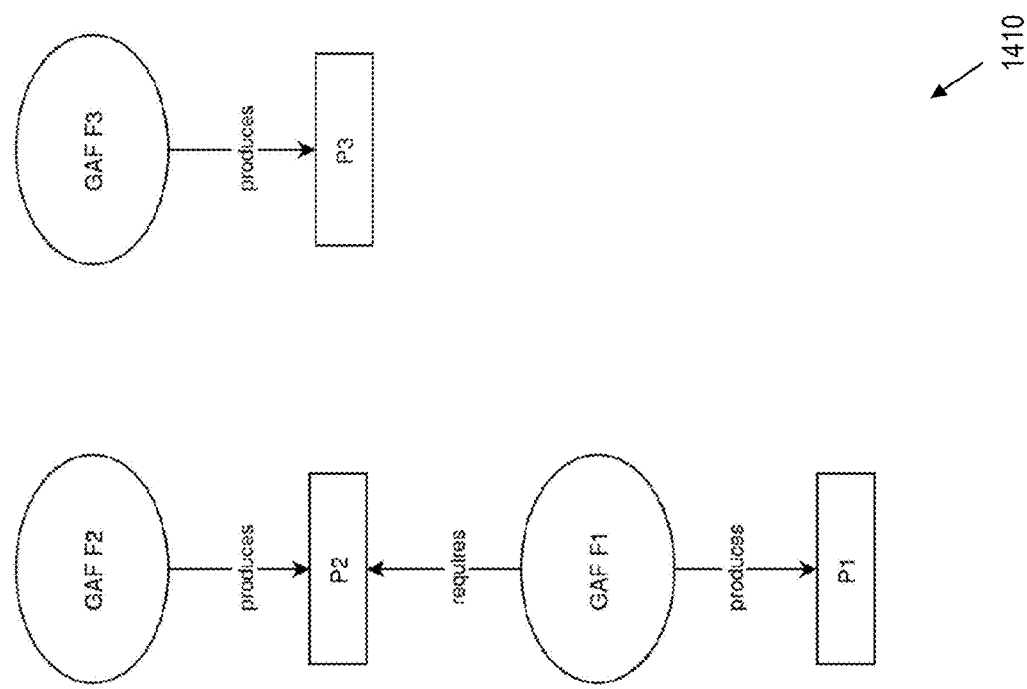
FIG. 14B

USING TEMPORARY TABLES TO STORE GRAPH ALGORITHM RESULTS FOR A RELATIONAL DATABASE MANAGEMENT SYSTEM

CROSS-REFERENCE TO RELATED APPLICATIONS

This application is related to the following, the entire contents of each of which are hereby incorporated by reference as if fully set forth herein:

U.S. patent application Ser. No. 17/584,262, filed Jan. 25, 2022, titled "Inline Graph Algorithm Execution With a Relational SQL Engine,"

U.S. patent application Ser. No. 17/080,698, filed Oct. 26, 2020, titled "Efficient Compilation of Graph Queries on Top of SQL Based Relational Engine,"

U.S. patent application Ser. No. 17/080,700, filed Oct. 26, 2020, titled "Efficient Compilation of Graph Queries Including Complex Expressions on top of SQL Based Relational Engine," and U.S. patent application Ser. No. 17/080,719, filed Oct. 26, 2020, titled "Efficient Compilation of Graph Queries Involving Long Graph Query Patterns on top of SQL Based Relational Engine".

FIELD OF THE INVENTION

The present disclosure relates to techniques for performing graph analytics functions for graph database objects. More specifically, the disclosure relates to implementation of graph analytics functions, for use in graph queries, by a relational database management system.

BACKGROUND

Graph processing is an important tool for data analytics. Relational database management systems (RDBMSs) increasingly allow users to define property graphs from relational tables and to query property graphs using graph pattern matching queries. Most products limit users to defining a property graph out of a single vertex table and a single edge table (e.g., Microsoft SQL Server, SAP Hana). These graphs are called homogeneous graphs. The most advanced systems (e.g., IBM DB2) allow definition of a graph out of multiple vertex and edge tables, which is referred to as a "heterogeneous" graph. Generally, for heterogeneous graphs, every row from every vertex or edge table represents a vertex or edge, respectively. For example, one can create a heterogeneous graph out of the existing tables in a database by mapping every dimension table to a vertex table and every fact table to an edge table. Generally, vertex tables should have a primary key column, and edge tables should associate two foreign keys corresponding to the primary keys in one or more vertex tables.

Graph analytics includes graph querying and pattern matching, which enables interactive exploration of graphs in a manner similar to interactive exploration of relational data using Structured Query Language (SQL). Pattern matching refers to finding patterns in graph data that are homomorphic to a target pattern, such as a triangle. Similar to SQL, in addition to matching a structural pattern, pattern matching may involve projections, filters, etc.

Graph analytics further includes graph algorithms. Graph algorithms analyze the structure of graph data, possibly together with properties of its vertices and/or edges, to compute metrics or subgraphs that help in understanding the global structure of the graph.

Existing industry solutions for graph analytics suffer from at least one of the following shortcomings: external processing requirements, lack of extensibility, and/or no support of heterogeneous graph data.

External processing requirements: Existing graph analytics systems can require an expensive extract-and-load process to make data from a data source (typically an RDBMS) available to an efficient graph processing engine.

No extensibility: Most existing solutions implement graph algorithms as built-in operations. This makes adding a new graph algorithm expensive in terms of engineering efforts, as additions require modification of the processing engine itself, which can considerably slow down adoption of innovations in graph algorithms. These solutions generally do not scale well in that they generally implement hundreds of graph algorithms and a multitude of variants, and do not allow users to declare algorithms for user-specific purposes.

No heterogeneous support: Existing solutions generally only support homogeneous graphs, in which the graph is defined on top of a single vertex table and a single edge table. In practice, representing complex graph data can be difficult, or even impossible, with a single vertex table and a single edge table. More importantly, the data may already be organized into sophisticated legacy multi-table schema, and it is important to be able to define graphs using these established tables without re-organization or duplicating existing data structures. Re-formatting graph data that is heterogeneous in nature into a simpler homogeneous format carries a substantial cost, and comes with its own limitations.

Discussed herein are approaches for supporting graph analytics inside an RDBMS that supports SQL that address the above issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 2 depicts example graph queries, including an example query with a Graph Algorithm Function (GAF).

FIG. 3 depicts an example GAF declaration.

FIG. 9 depicts example graph queries with composite GAFs.

FIG. 13 depicts a primary table and a temporary table that stores more than one GAF-computed property.

FIG. 14B depicts an example dependency graph reflecting dependencies of composite GAFs in a query and a query plan that depicts parallel GAF execution.

DETAILED DESCRIPTION

Figure 1:
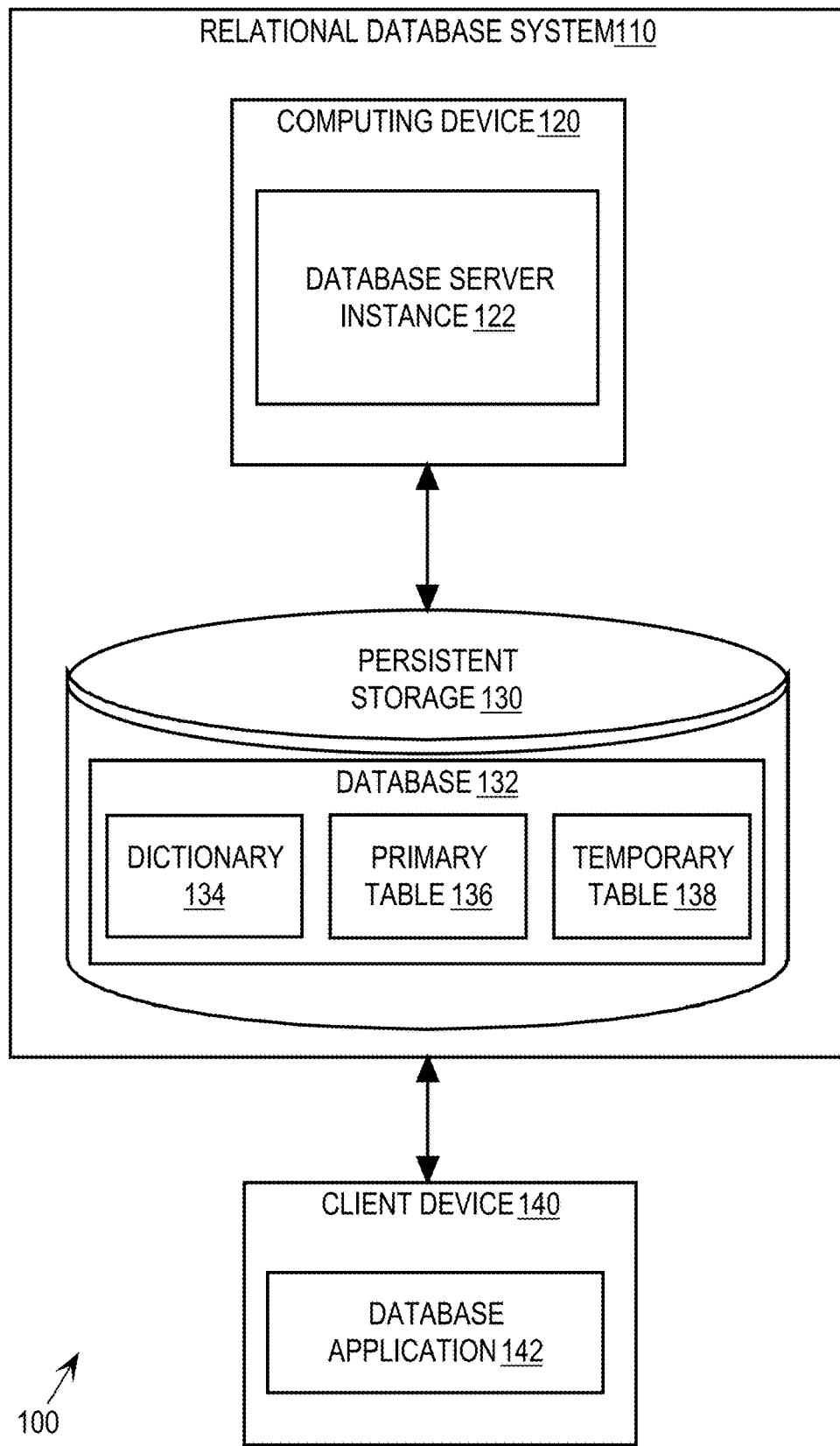
FIG. 1 depicts an example database system configuration.

In the following description, for the purposes of explanation, numerous specific details are set forth in order to provide a thorough understanding of techniques described herein. It will be apparent, however, that the described techniques may be practiced without these specific details. In other instances, well-known structures and devices are shown in block diagram form in order to avoid unnecessarily obscuring the described techniques.

1. General Overview

Techniques described herein facilitate the addition of user-defined graph algorithms, in a relational database with graph pattern matching capabilities, without changing the query compiler nor the query execution engine. Techniques described herein support in-query execution, as an extension to the SQL/Property Graph Query (PGQ) graph querying language, and allows user-defined graph algorithms to support graphs of arbitrary shapes in terms of edge and vertex tables.

According to various embodiments, a user-defined graph algorithm that is invoked during a graph query may return one or more values per vertex or edge of an input graph that is the target of the user-defined graph algorithm. These values are stored in newly created properties of the graph, e.g., within temporary tables, which are accessible within the scope of the graph query. Other kinds of graph algorithms can be implemented with this framework, with a potential overhead. For example, user-defined graph algorithms that return a subgraph can be implemented using a boolean property that indicates whether each vertex or edge is part of the subgraph.

Techniques described herein allow a user of an RDBMS to declare a graph algorithm function (GAF) based on a GAF signature and GAF functions, which define a graph algorithm that takes a graph object as input and returns a logical graph object as output. GAFs are used within graph queries to compute temporary and output properties (referred to as "GAF-computed properties"). The output properties computed by the GAF are accessible in the enclosing graph pattern matching query as though they were part of the input graph object of the GAF. The GAF-computed properties are live for the duration of the query cursor execution. Temporary cursor-duration tables are generated for the query cursor during compilation of a graph query that includes one or more GAFs. These temporary tables are used to store the GAF-computed properties. Storage for the temporary tables is reclaimed after execution of the query cursor is complete. Each temporary table corresponds to one of the primary tables of the input graph object, and includes, as a foreign key, primary key information from the corresponding primary table. Thus, the input graph of a GAF may be composed of multiple vertex and/or edge tables, i.e., a "heterogeneous" graph. Furthermore, the temporary tables may be joined with primary tables of the input graph to correlate graph properties with GAF-computed properties. Each temporary table may store one or more GAF-computed properties.

1.1. SQL/PGQ Queries

Embodiments are described herein in the context of an example database system configuration 100 depicted in FIG. 1. Specifically, example database system configuration 100 comprises an RDBMS 110, which maintains a database 132 containing database objects (such as tables and indexes) in persistent storage 130. Database 132 further includes a database dictionary 134, as described in further detail below. In this example configuration, a database application 142 running on a client device 140, which is communicatively coupled to RDBMS 110 in any way, including via a network, establishes a database session with database server instance 122, running on a computing device 120 of RDBMS 110, to execute database commands from application 142.

The SQL/PGQ standard allows graph querying and pattern matching inside a SQL query, e.g., executed by database server instance 122, but does not allow for execution of graph algorithms. SQL/PGQ also provides a way to declare property graphs on top of relational tables that act as vertex and edge tables. SQL/PGQ queries are identified by the GRAPH_TABLE operator in a SQL query.

To illustrate, example Query 200 depicted in FIG. 2 refers g, which is a database object that represents a property graph, e.g., that is defined via execution of a Data Definition Language (DDL) statement on top of a set of relational vertex/edge tables storing data for the property graph to create a graph object from the relational tables, as described in further detail below. Query 200 causes each vertex v within the property graph g to be evaluated to determine whether the vertex matches the pattern defined in the query, i.e., that the vertex is a person that has the job attribute "MANAGER". The query projects out the name and salary values, from the underlying tables of property graph object g, as properties of the vertices that match the query pattern.

Techniques are described herein for executing a graph algorithm that replaces the graph argument of the GRAPH_TABLE operator. As described in further detail below, the result of the graph algorithm is a new logical graph object, which is then used in the graph query that invoked the graph algorithm. According to various embodiments, no copy is made of the graph data that defines the logical graph object created by execution of the graph algorithm; the new graph object returned is composed of metadata referencing the original graph data plus data for the properties calculated by the graph algorithm.

In example Query 210 depicted in FIG. 2—which, e.g., is submitted to RDBMS 110 by database application 142—the graph algorithm my_algorithm is executed over the input graph object g. As discussed in further detail below, my_algorithm uses, as input, input property 212, named salary, that exists in graph object g, and writes results of the graph algorithm into new output properties 214, named result1 and result2. Output properties 214 are then projected out in the COLUMNS clause 216, only for the Persons that are associated with the job property "MANAGER".

The resulting graph produced by the graph algorithm contains new properties that are filled by the graph algorithm. As shown in example Query 210 of FIG. 2, the names of these new output properties 214 can be specified by the user when calling the graph algorithm, e.g., using a new PROPERTY operator. In the context of example RDBMS 110 executing Query 210, the RDBMS automatically creates these new properties, and they are immediately available in the graph query that invokes the graph algorithm (see v.result1 and v.result2 in COLUMNS clause 216 of Query 210). The query containing the graph algorithm is statically type-checked and compiled, and RDBMS 110 takes the result of the graph algorithm into account during the compilation and typechecking.

According to various embodiments, invocation of a graph algorithm further specifies whether each property is an input/output property and/or whether it is a vertex/edge property. To illustrate in the context of example query 210, the call to my_algorithm is adjusted as follows: "my_algorithm (g, PROPERTY (VERTEX INPUT salary), PROPERTY (VERTEX OUTPUT result1), PROPERTY (VERTEX OUTPUT result2))".

1.2. Temporary Tables

According to various embodiments, cursor-duration temporary tables are used to store properties computed by a graph algorithm. These temporary tables are mapped to primary tables storing graph data, are populated with properties computed by the graph algorithm, and are returned by the graph algorithm. According to various embodiments, using temporary table functionality, property values computed by different executions of the same query are private to the invoking graph query execution. Specifically, data within the temporary tables is associated with a particular cursor execution, which has exclusive access to the data in the temporary tables and which cannot access data in the temporary tables that is associated with another cursor execution. Because each cursor execution cannot access data in the temporary tables that is associated with another cursor execution, the RDBMS supports multiple concurrent executions of the same cursor that contains a GAF. RDBMS 110 automatically reclaims storage allocated for temporary tables, for a given query execution, at the end of the query execution. The space used to store the results of the graph algorithm in the temporary tables is managed automatically by RDBMS 110.

1.3. Advantages

Support for graph analytics in the RDBMS, as provided by techniques described herein, provides a lean and efficient implementation of graph analytics algorithms operating over relational storage. Specifically, techniques described herein represent an innovative method to ease extending an RDBMS query execution engine with graph algorithms with the following benefits:

1. In-database processing: Techniques described herein execute graph algorithms within a RDBMS, as part of query execution, directly using relational tables. No data movement or reformatting is necessary.
2. Highly extensible: Techniques described herein do not require modifying the RDBMS kernel to add new graph algorithms. Graph algorithms can be added to the system, at any time, by implementing two PL/SQL functions according to a well-defined protocol between the SQL query compiler/execution engine and the graph algorithm. Thus, the graph algorithm framework is not hardcoded, and allows for extension. That is, allowed parties can add new graph algorithms, and by implementing a simple protocol, the query compiler is made aware of the result of the graph algorithm, which makes static compilation and type checking possible.
3. Heterogeneous support: Techniques described herein support heterogeneous graphs by default. The protocol defined between the SQL compiler/execution engine and the graph algorithm allows graph algorithms to support any shape of heterogenous property graphs (i.e., defined on top of any number of vertex or edge tables).
4. In-query execution: Techniques described herein allow the convenience of invoking a graph algorithm and querying the result of the graph algorithm as a graph itself, using graph querying and pattern matching, within a single SQL query.
5. Composite graph algorithm support: Techniques described herein facilitate using the results of a first graph algorithm as the input to a second graph algorithm, resulting in properties computed by multiple graph algorithms being available within an invoking SQL query.

2. Graph Algorithm Specification

According to various embodiments, RDBMS 110 is configured to allow a user to provide information defining a graph algorithm as a Graph Algorithm Function (GAF). For example, RDBMS 110 receives one or more DDL statements, such as example GAF declaration 300 of FIG. 3, that includes a GAF declaration describing the GAF. A GAF declaration, such as example declaration 300, provides implementing details for a user-defined GAF. GAF declaration information is maintained in dictionary 134 maintained by RDBMS 110. GAF declaration 300 includes a GAF signature 320 and a package 310 with implementation functions for the GAF.

RDBMS 110 executes the CREATE command in GAF signature 320, which causes metadata for the defined function to be stored in dictionary 134. In the example of GAF declaration 300, the metadata for the GAF stored in dictionary 134 comprises the arguments of the GAF, including the input graph object 302 (e.g., g) and any input properties 304 (e.g., salary_GAF) or output properties 306 (e.g., result1_GAF and result2_GAF). Example GAF signature 320 explicitly identifies whether each input and output property is a vertex- or edge-type property and whether it is an output or input property, which is also included in the metadata for the GAF stored in dictionary 134.

A GAF declaration further includes two functions:

A DESCRIBE function 312 that is invoked by the RDBMS query compiler when a query invoking the defined graph algorithm function (GAF) is compiled. As described in further detail below, given the arguments to the GAF, DESCRIBE function 312 lists the input and output properties of the GAF with their respective types. When one or more temporary properties are used by a GAF, the DESCRIBE function of the GAF provides information for the one or more temporary properties. For each temporary property, the DESCRIBE function identifies a name, a type, and whether it is a vertex or edge property. An example DESCRIBE function 312 is included in Table 1 below.

An EXECUTE function 314 that is invoked by the RDBMS query execution engine. As described in further detail below, given the arguments to the GAF and additional information described below, EXECUTE function 314 executes the defined graph algorithm, e.g., by using the identified input properties of the input graph object to compute the temporary and output properties for the GAF. A signature of an example EXECUTE function 314 is included in Table 2 below.

TABLE 1

```
-- EXAMPLE DESCRIBE FUNCTION 312
FUNCTION  DESCRIBE
    g          IN DBMS_GAF.PROPERTY_GRAPH_T,
    salary     IN DBMS_GAF.VERTEX_INPUT_PROPERTY_T,
    result1    IN DBMS_GAF.VERTEX_OUTPUT_PROPERTY_T,
    result2    IN DBMS_GAF.VERTEX_OUTPUT_PROPERTY_T)
RETURN DBMS_GAF.DESCRIBE_T
IS
    desc_res DBMS_GAF.DESCRIBE_T := DBMS_GAF.DESCRIBE_T( );
BEGIN
    -- Vertex BINARY_DOUBLE input property 'salary'
    desc_res.EXTEND (1) ;
    desc_res (1) := salary;
    desc_res (1) .type := DBMS_TF.TYPE_BINARY_DOUILE;
    -- Vertex BINARY_DOUBLE output property 'result1'
    desc_res.EXTEND (1) ;
    desc_res (2) := result1;
    desc_res (2) .type := DBMS_TF.TYPE_BINARY_DOUBLE;
    -- Vertex NUMBER output property 'result2'
    desc_res.EXTEND (1);
    desc_res (3) := result2;
    desc_res (3) .type := DBMS_TF.TYPE_BINARY_DOUBLE;
    -- Vertex NUMBER temporary property 'vtmp1'
    desc_res.EXTEND (1);
    desc_res (4) := NULL;
    desc_res (4) .type := DBMS_TF.TYPE_NUMBER;
    desc_res (4) .name := 'vtmp1';
    desc_res (4) .is_vertex_prop := TRUE;
    desc_res (4) .prop_kind := DBMS_GAF.PROPKIND_TEMP_PROPERTY;
    -- Edge BINARY_DOUBLE temporary property 'etmp1'
    desc_res.EXTEND (1);
    desc_res (4) := NULL;
    desc_res (4) .type := DBMS_TF.TYPE_BINARY_DOUBLE;
    desc_res (4) .name := 'etmp1';
    desc_res (4) .is_vertex_prop := FALSE;
    desc_res (4) .prop_kind := DBMS_GAF.PROPKIND_TEMP_PROPERTY;
    RETURN desc_res;
END;
```

TABLE 2

```
-- EXAMPLE EXECUTE FUNCTION 314
PROCEDURE    EXECUTE (
    g          IN DBMS_GAF.PROPERTY_GRAPH_T,
    salary     IN DBMS_GAF.VERTEX_INPUT_PROPERTY_T,
    result1    IN DBMS_GAF.VERTEX_OUTPUT_PROPERTY_T,
    result2    IN DBMS_GAF.VERTEX_OUTPUT_PROPERTY_T);
```

As shown in GAF signature 320, an example graph algorithm specification for an RDBMS supporting the PL/SQL language, such as RDBMS 110, can take the form of a PL/SQL function with a special GRAPH ALGORITHM USING <package-name> clause. The package-name in the clause must name a PL/SQL package that must define a DESCRIBE function and an EXECUTE function for the GAF. A function declared with a GRAPH ALGORITHM USING clause can only be invoked from within a GRAPH_TABLE operator in a SQL query, as described in further detail below.

Thus, GAF declaration 300 declares a graph algorithm, my_algorithm, having an input property g, a vertex input property salary_GAF, a vertex output property result1_GAF, and a vertex result property result2_GAF, and which returns a property graph object. Example GAF declaration 300 includes a package 310 called DBMS_OGA_MY_ALGORITHM, which includes the required DESCRIBE function 312 and EXECUTE function 314 implementing the GAF. Examples of these implementation functions are provided below.

GAF declaration 300 includes a PROPERTY_GRAPH keyword that identifies an object of the property graph type, and multiple other keywords (such as VERTEX_INPUT_PROPERTY) that identify the types of properties being used. GAF signature 320 indicates that the GAF returns a property graph object, since the data that is returned may be interpreted as a property graph object, as described in further detail below. Furthermore, a GAF signature may identify an argument that is not related to property graphs, such as an argument of type NUMBER (which would be passed in for a call to the GAF in a graph pattern matching query).

3. Syntax 3.1. Gaf Invocation

GAF is an extension to the existing SQL/PGQ syntax. Syntax-wise, a GAF appears as the first argument of a GRAPH_TABLE operator. This first argument represents the graph on which to perform the graph pattern matching query. When a GAF is present, the graph query is performed on the graph returned by the GAF. A GAF invocation takes a graph as argument, which is referred to herein as the input graph.

Table 3 includes example GRAPH_TABLE syntax without and with a GAF.

TABLE 3

```
-- GRAPH_TABLE without GAF
GRAPH_TABLE (my_graph MATCH . . .
--       --------
         input graph
-- GRAPH_TABLE with GAF
GRAPH_TABLE (my_algorithm ( my_graph, . . . ) MATCH . . .
--       ------------           --------
--       GAF execution          input graph for GAF
--
-- the MATCH is performed on the graph returned by the GAF
```

This extension to the GRAPH_TABLE syntax is non-intrusive, does not conflict with the current standard, and is consistent with the semantic of the first argument to GRAPH_TABLE. The GAF invocation itself can be parsed as a graph-valued function call, with a specific graph argument.

3.2. Property

GAF involves three kinds of properties: input properties, output properties, and temporary properties. Input properties exist in the definition of the GAF input graph and are read by the GAF. Output properties are created by the GAF; they represent the results of the GAF's computation(s). Output property names may not conflict with an existing property of the graph. Temporary properties are used to store temporary computation results; they are created and used during the computation of the GAF, and their lifetime does not exceed the execution of the GAF that created them. Output properties can appear in the COLUMNS/WHERE clause of the graph pattern matching query, whereas temporary properties are used for the purpose of the computation and are not available within the graph pattern matching query.

According to various embodiments, because of this strong differentiation between input and output properties, a property may not be of both input- and output-type. Accordingly, property values stored in the input graph data are not overwritten by the GAF. A GAF stores computed results in structures that are distinct from the structures storing input graph data. This helps ensure that graph algorithms can be executed concurrently on the same input graph.

The names of input and output properties are passed in by the user when invoking the GAF. GAFs support any input graph, which is facilitated by user-supplied input and output property names. Accordingly, a new PROPERTY pseudo-operator specifies the names of input and output properties of a GAF. The PROPERTY pseudo-operator takes, as arguments, a property name and optionally a default value. The following Table 4 represents example PROPERTY pseudo-operator syntax.

TABLE 4

```
-- Basic PROPERTY syntax
GRAPH_TABLE (my_algorithm (my_graph, PROPERTY (salary), . . . )
   MATCH . . .
-- PROPERTY with default value supplied
GRAPH_TABLE (my_algorithm (my_graph, PROPERTY
(salary DEFAULT ON
   NULL -1.0), . . . ) MATCH . . .
```

Depending on the GAF being executed, the property passed as an argument may either be used as an input or output property. If the GAF uses an argument as an input property, the identifier supplied to PROPERTY must identify an existing property of the graph. The GAF reads the values of that property during its computation. If the property is used as an output property, the identifier supplied to PROPERTY is the name of a new property added to the graph returned by the GAF. In this case, the identifier must not conflict with any existing property of the graph.

According to various embodiments, annotation keywords (such as VERTEX, EDGE, INPUT, OUTPUT, etc., or combinations thereof) are used in connection with the PROPERTY pseudo-operator to identify whether particular properties are edge or vertex properties and whether they are input or output properties. For example, PROPERTY (VERTEX INPUT salary) indicates that salary is an input property of graph vertices.

An optional default value can be specified when providing an input property to the graph. An identified default value is used to replace any NULL values stored in the associated property. The default value is also used if one or more vertex or edge tables do not declare the input property at all.

4. Semantic Analysis

Figure 4:
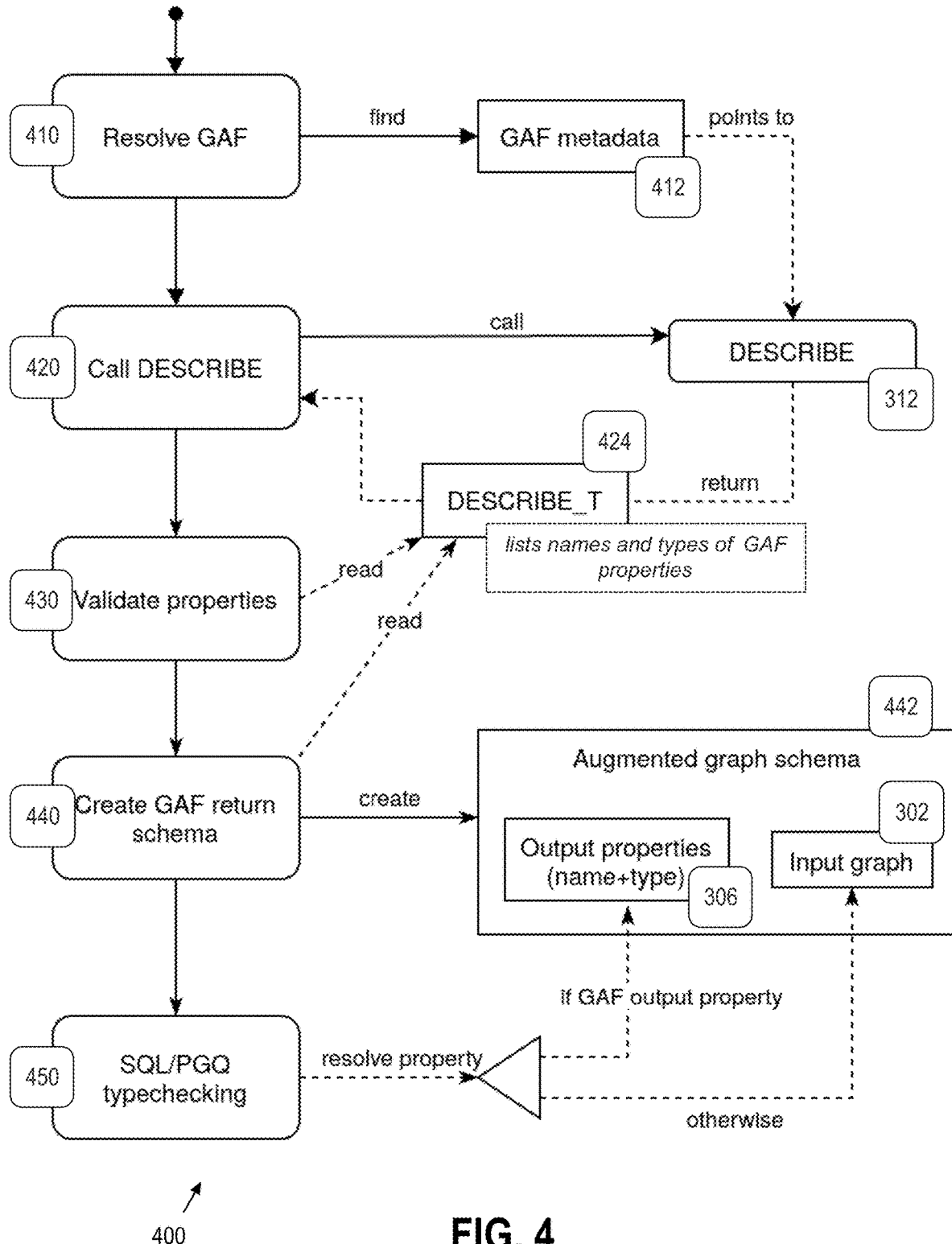
FIG. 4 depicts an example flowchart for GAF semantic analysis.

Semantic analysis is a phase in the GAF compilation process, and involves multiple steps; FIG. 4 depicts an example flowchart 400 for GAF semantic analysis.

4.1. Describe Function

Semantic analysis of a graph query that contains a GAF invocation involves calling the DESCRIBE function of the GAF declaration. Accordingly, at step 410 of flowchart 400, a GAF included in a graph query is resolved. For example, in connection with compiling query 210, a query compiler of RDBMS 110 uses dictionary 134 to resolve my_algorithm, in query 210, to GAF signature 320 and obtain, from the dictionary, metadata 412 associated with the GAF. Metadata 412 includes information from the declaration 300 of the GAF, including an identifier of the package 310 that defines the DESCRIBE function 312 and the EXECUTE function 314 for the GAF. Using metadata 412, the query compiler resolves the DESCRIBE function 312 for the GAF.

At step 420 of flowchart 400, the resolved DESCRIBE function 312 is executed. DESCRIBE function 312 returns information describing properties of the GAF, including their names and types, e.g., in a DESCRIBE_T data structure 424 that includes a description of each property (output and temporary) computed by the GAF.

4.2. Property Validation

Once DESCRIBE function 312 returns, at step 430 of flowchart 400, the content of DESCRIBE_T data structure 424 is read to validate the input and output properties used by the GAF.

According to various embodiments, for input properties, the following is validated:
1. A property with that name exists in the input graph data.
2. The type of the property in the input graph matches the type associated with that property name in DESCRIBE_T data structure 424.
   If the types do not match exactly, RDBMS 110 may decide to introduce implicit conversions, broadening the space of accepted types.
3. At least one vertex/edge table in the graph exposes the property.
   For vertex/edge tables that do not expose the property, the property is read as NULL.
4. If a default value is supplied, the type of the default value matches that of the property.
5. If no default value is supplied, the property exposes a NOT NULL column of every vertex/edge table.

According to various embodiments, directly using NULL property values is disallowed in graph algorithms. This is not a technical limitation, but a restriction put in place for the semantics of graph algorithms. Specifically, graph algorithms are mathematical computations. What is modeled with "input properties" are additional data for each vertex or edge of the graph that the GAF uses to perform its computation. For example, an input property may represent the "length" of an edge for a graph algorithm that computes the shortest length of paths from one vertex to another. In such a scenario, it is neither easy nor desirable to define what the mathematical algorithm should do with a missing/NULL value. Therefore, according to various embodiments, it is required that a GAF invocation provide information for handling NULL values in input properties by defining a default value for each input property that may have NULL values, as depicted by the example query in Table 4.

According to various embodiments, for output properties, the following is validated:
1. At least one output property is defined.
    This is a sanity check. If the GAF produces no output properties, it is pointless to execute the function.
2. The names of the output properties are all distinct.
3. The name of each output property is distinct from any property in the input graph.
4. No default value is supplied for any output property.
    This is also a sanity check, as it makes no sense to have a default value for an output property.

Output properties are guaranteed to never be NULL.

4.3. Graph Query Typechecking

Once all of the properties used by a GAF have been validated at step 430 of flowchart 400, at step 440 of flowchart 400, an in-memory data structure representing an augmented graph schema 442 is created, which represents the properties of the original input graph object 302 plus the output properties 306 defined by the GAF. As such, augmented graph schema 442 reflects the metadata of the graph returned by the GAF.

Note that augmented graph schema 442 is a metadata-only representation. At step 440 of flowchart 400, no data has yet been computed for the new output properties created by the GAF because the EXECUTE function for the GAF has not yet been run. Further, data from the input graph object has not been accessed at this step. Metadata defining the input graph object 302 is included in augmented graph schema 442, which includes the list of vertex and edge tables composing input graph object 302, table columns forming the keys, etc.

At step 450 of flowchart 400, the graph query that includes the GAF invocation is typechecked using augmented graph schema 442 representing the extended graph object to be returned by the GAF. According to various embodiments, the graph query typechecking process itself is unchanged. Under the hood, when the typechecker of RDBMS 110 requires the type of a property included in the query, the list of output properties created by the GAF is examined. If the property is found in the list of output properties, the type specified by the GAF is returned. If no such property is found in the list of output properties, the request is forwarded to the data dictionary layer (e.g., dictionary 134), which maintains the definition metadata for the input graph object (e.g., from the DDL defining the graph object), to determine whether the property is defined for the input graph.

This process makes the output properties created by the GAF readily available in the enclosing graph query. Users can directly use the properties created by the GAF in any circumstances that pre-existing properties of the input graph can be used, e.g., in the WHERE or COLUMNS clause of a SQL/PGQ query. Step 450 of flowchart 400 concludes the semantic analysis of the graph query that invokes a GAF.

5. Generation of the Execution Plan

Once the semantic analysis of the graph query with its GAF completes, RDBMS 110 generates a shared execution plan (i.e., a cursor) for the graph query. This execution plan is cached and executed every time the query is issued.

As for other operators in queries requiring temporary tables, the compiler of RDBMS 110 reserves the temporary tables needed for graph algorithm execution and associate these with the execution plan generated for the graph query. The number and schema of these temporary tables are determined by (1) the shape (underlying tables) of the input graph and (2) the output and temporary properties required by the graph algorithm, as explained in detail below.

5.1. Use of Temporary Tables

According to various embodiments, output and temporary property values produced by a GAF are stored in temporary tables, each of which includes the primary key columns from a primary table that stores graph data for the input graph of the GAF. Using temporary tables, techniques described herein accommodate the input graph for a GAF being comprised of heterogeneous graph data. The temporary tables are created once when building the cursor, and are reused for every execution of said Cursor.

Figure 5:
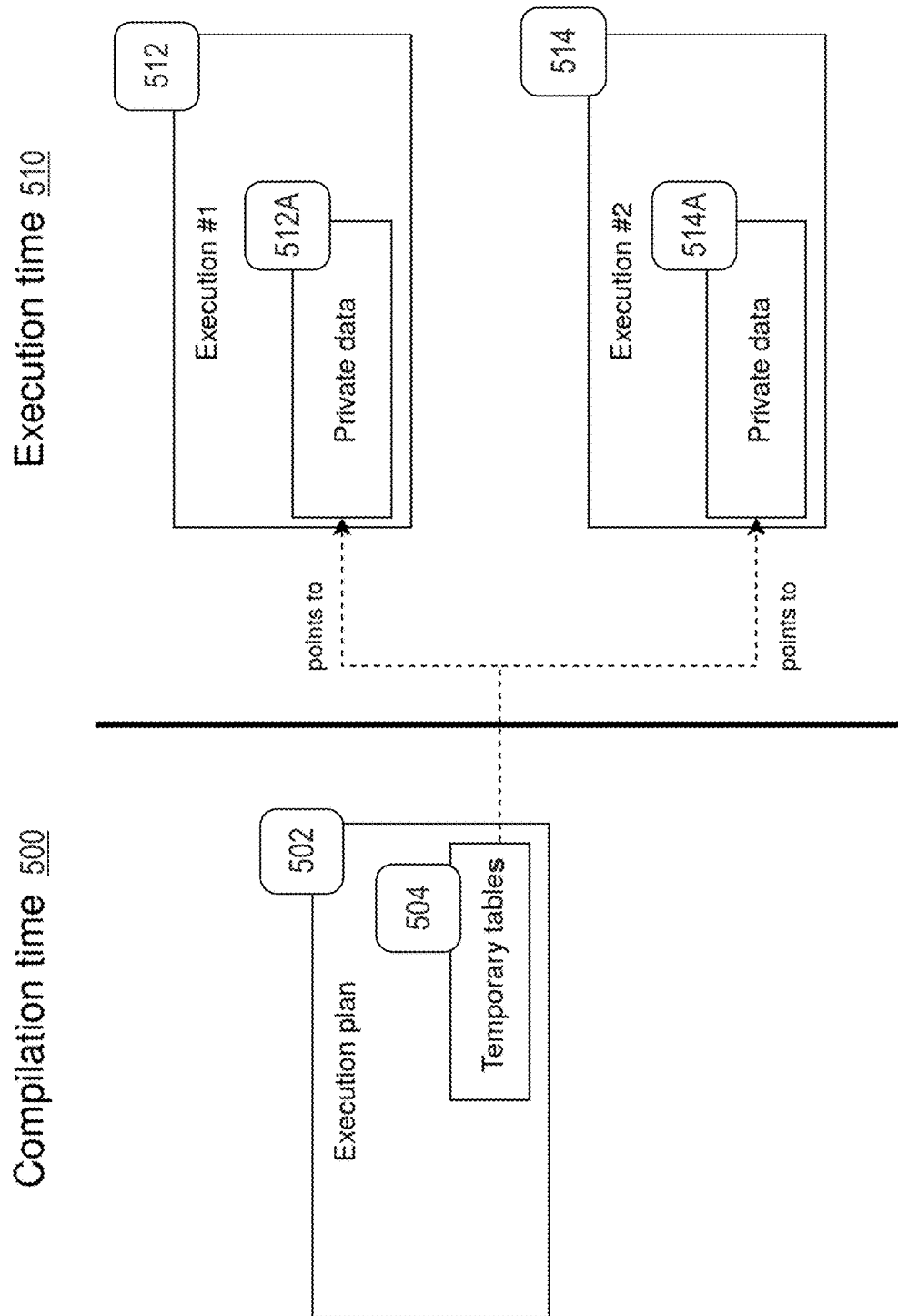
FIG. 5 depicts an example execution plan (cursor) for a graph query, and example cursor executions.

FIG. 5 depicts an example execution plan 502 (a cursor) generated at compilation time 500, with reserved temporary tables 504, and example cursor executions 512 and 514 at execution time 510. In order for multiple cursor executions to run simultaneously, the content of temporary tables 504 must be private to the executions of the cursor. As shown in FIG. 5, temporary tables 504 point to private data 512A in cursor execution 512 and independently to private data 514A in cursor execution 514. That is:

- any cursor execution only reads and writes to its "private storage";
- when reading temporary tables, the cursor execution only sees the data that the cursor execution has written in this table;
- concurrent cursor executions do not see each other's data; and
- any data written during the cursor's execution is cleaned up (i.e., the storage used for the data is automatically reclaimed) at the end of the cursor, as described in further detail below.

Using such temporary tables allows RDBMS 110 to create tables needed for GAF computation only during compilation time 500, and to reuse the same tables safely during execution time 510, even in the case of concurrent executions of the same cursor. In RDBMSs that do not support such temporary tables, regular tables can be created on the fly when executing the cursor and dropping the created tables at the end of cursor execution. However, this adds additional overhead at runtime.

5.2. Creation of Temporary Tables

Thus, creating temporary tables (as described above) for all output and temporary properties of the GAF is performed during query compilation. According to various embodiments, one temporary table is created for each pair <output property, vertex/edge table of input graph>, and for each pair <temporary property, vertex/edge table of input graph>. For example, if there are multiple vertex tables representing data for the input graph, and there is a vertex-type output property, then a separate temporary table is generated for the output property for each vertex table. The mapping is tracked between each pair (GAF-computed property, graph element primary table) and the corresponding temporary table. Mapping data reflecting these mappings is provided to the EXECUTE function.

According to various embodiments, each temporary table has the following schema:

- Columns $c_1 \ldots c_{(n-1)}$ are the same as the key columns of the corresponding graph element table. These columns have the same name and type as the corresponding column in the key defined for the primary table (i.e., the corresponding graph element table).
- The last column $c_n$ is used to store the output or temporary property, and the type of the column is that of the property to be stored. The name of the column may or may not be the same as the name of the property defined, depending on whether that property name conflicts with any of the key column names. In case of a name conflict, a new unique name is generated, and a mapping from the property name to the column name is kept for that particular temporary table.

Figure 6:
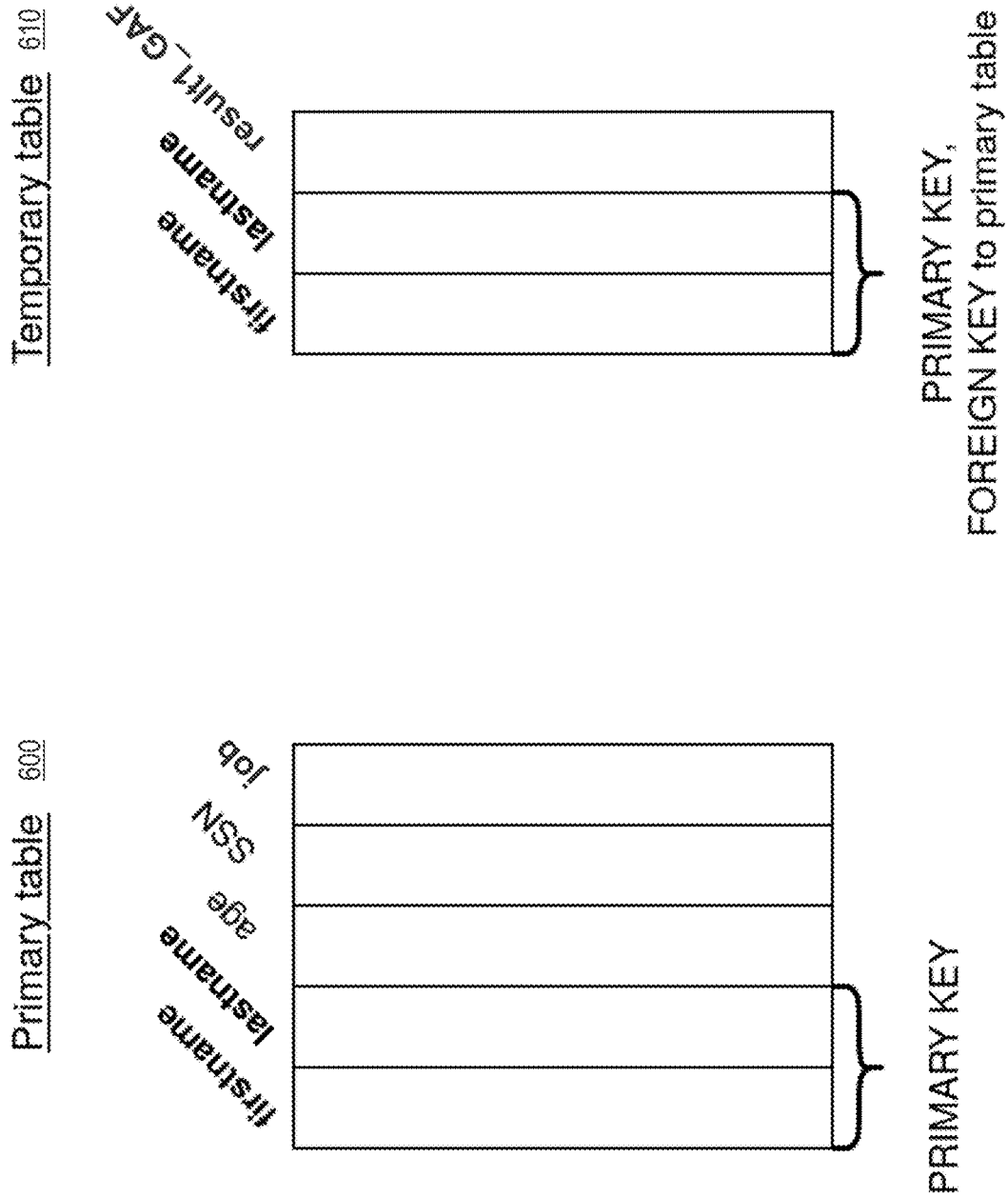
FIG. 6 depicts an example primary table schema and example temporary table schema.

FIG. 6 depicts an example primary table schema 600 and example temporary table schema 610 that represents a temporary or output property for the graph elements represented in the primary table. Primary table schema 600 defines two columns (firstname, and lastname) that represent the primary key of the primary table. Accordingly, temporary table schema 610 defines the two columns (firstname, and lastname) of the primary key, which act as a foreign key to the primary table. Temporary table schema 610 further includes a result1_GAF column, which is an output property 306 that will be calculated by the example GAF defined in GAF declaration 300. Note that the temporary tables do not contain any data until execution time. For purposes of explanation, primary table 136 in database 132 (FIG. 1) is based on primary table schema 600, and temporary table 138 is based on temporary table schema 610. These tables are depicted as being within persistent storage 130, but may be stored wholly or partly within volatile memory, e.g., of computing device 120.

5.3. Graph Query Execution Plan

Once the temporary tables have been created for all output and temporary properties for a GAF, the execution plan is generated for the graph query. The graph query that invokes the GAF may (and semantically should) read values produced for the output properties of the GAF, which may be accomplished by a table scan on the temporary table corresponding to that property. Specifically, when a graph query execution plan needs to read the value of an output property for a given graph element table, the corresponding temporary table is identified from the mapping built previously and a table scan is performed on the temporary table. This operation appears in the execution plan for the graph query.

In many cases, both properties stored in the primary table and in one or more temporary tables must be read for the same vertex or edge. In such cases, joins may be generated between the primary table and the corresponding temporary tables. These joins are performed on the primary key of the primary table, which is replicated in all of the temporary tables (i.e., in columns $c_1 \ldots c_{(n-1)}$ described above).

Figure 7A:
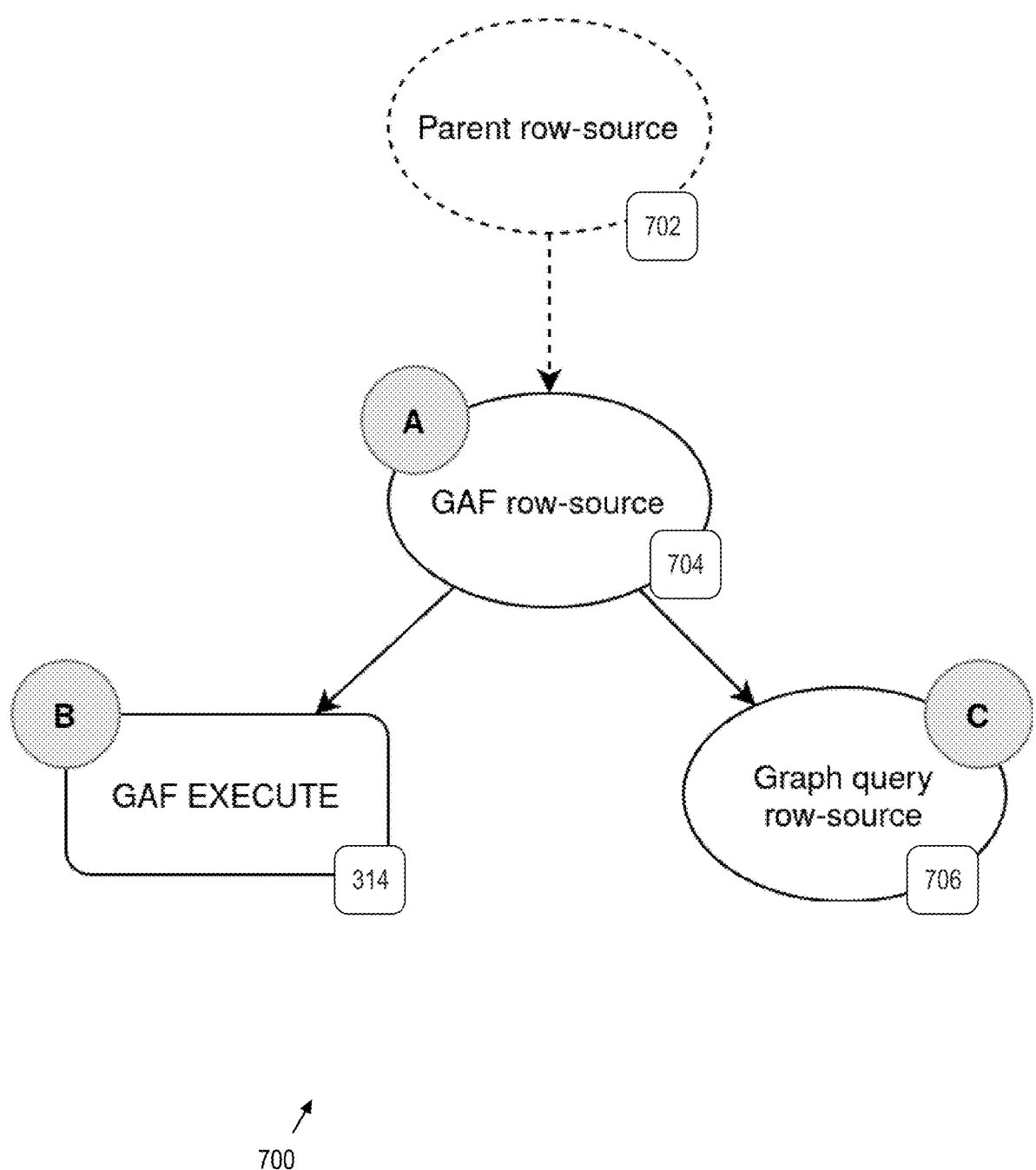
FIG. 7A depicts an example row-source tree for an example execution plan for a graph query.

Thus, the RDBMS generates a fully-functional execution plan for the graph query, with a specific operator at the top for the GAF execution. An execution plan generally takes the form of a tree of data flow operators (e.g., a row-source tree). FIG. 7A depicts an example row-source tree 700 for an example execution plan for a graph query, such as query 210 (FIG. 2) that includes the example GAF, my_algorithm, as outlined in declaration 300 (FIG. 3). Specifically, row-source tree 700 identifies the parent row-source 702, which will request rows from GAF row-source 704, e.g., representing my_algorithm. GAF row-source 704 is generated based on execution of EXECUTE function 314 in GAF declaration 300, which is executed once upon starting GAF row-source 704 for the execution plan. Execution of EXECUTE function 314 does not produce rows, but instead computes temporary computed values for an input graph object 302, e.g., within a temporary table such as temporary table 138, as discussed in further detail below.

Figure 7B:
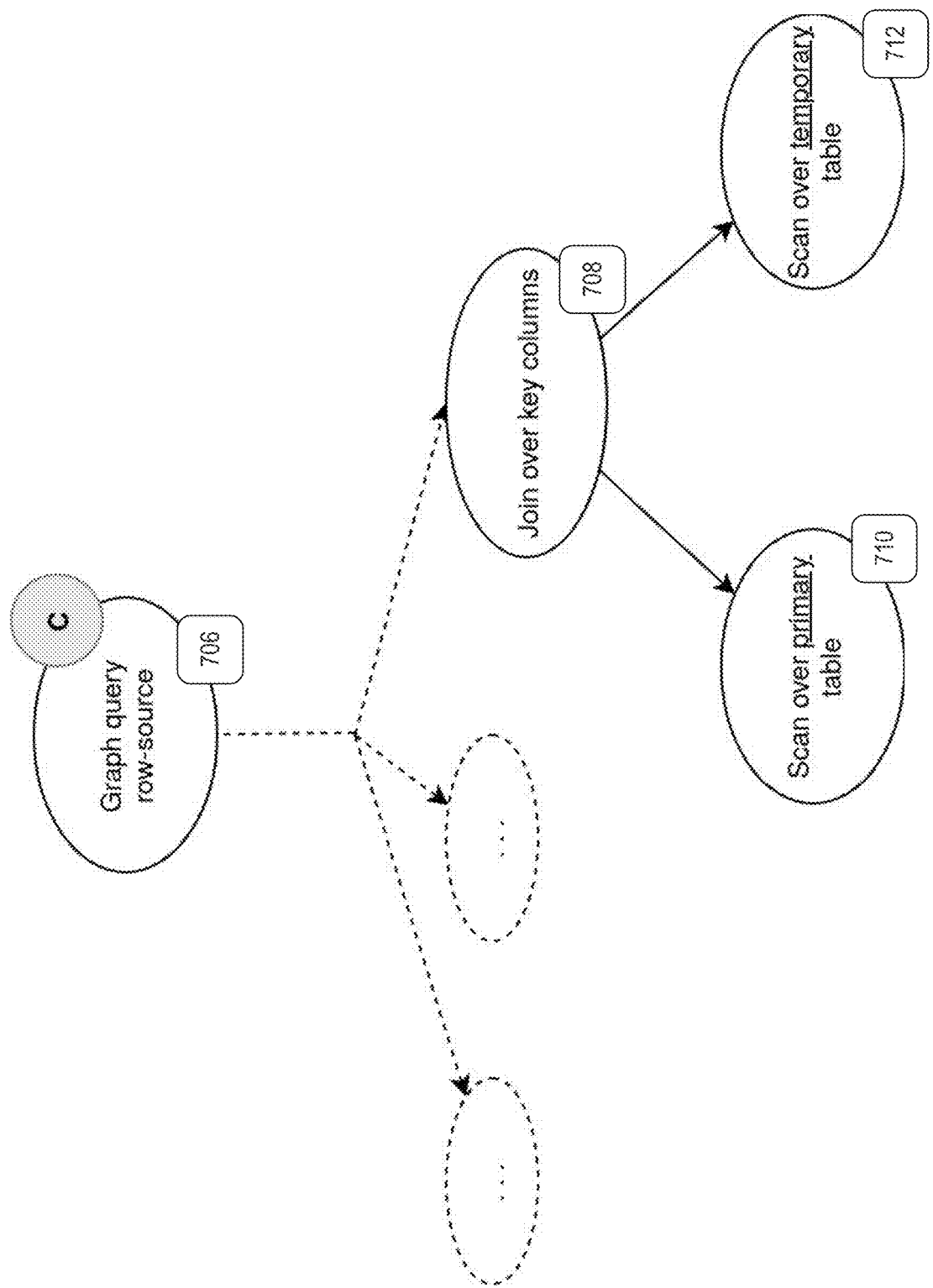
FIG. 7B depicts example operations for graph query row-source.

Once the EXECUTE function has completed, when parent row-source 702 requests rows from GAF row-source 704, graph query row-source 706 produces rows based on executing graph query 210. FIG. 7B depicts example operations for graph query row-source 706. Specifically, in order to project out an output property—such as v.result1 (214) that is computed by my_algorithm and stored in a temporary table in a cursor for query 210—the temporary table that stores the output property is joined with a corresponding primary table storing graph data for the input graph of the GAF. Accordingly, row-source 708 represents a join between a temporary table (such as temporary table 138) and a primary table storing graph data (such as a primary table 136). As shown in FIG. 7B, row-source 708 obtains rows for primary table 136 from a row-source 710 that represents a scan of the primary table, and obtains rows for temporary table 138 from a row-source 712 that represents a scan of the temporary table.

6. Graph Query Execution

Figure 8:
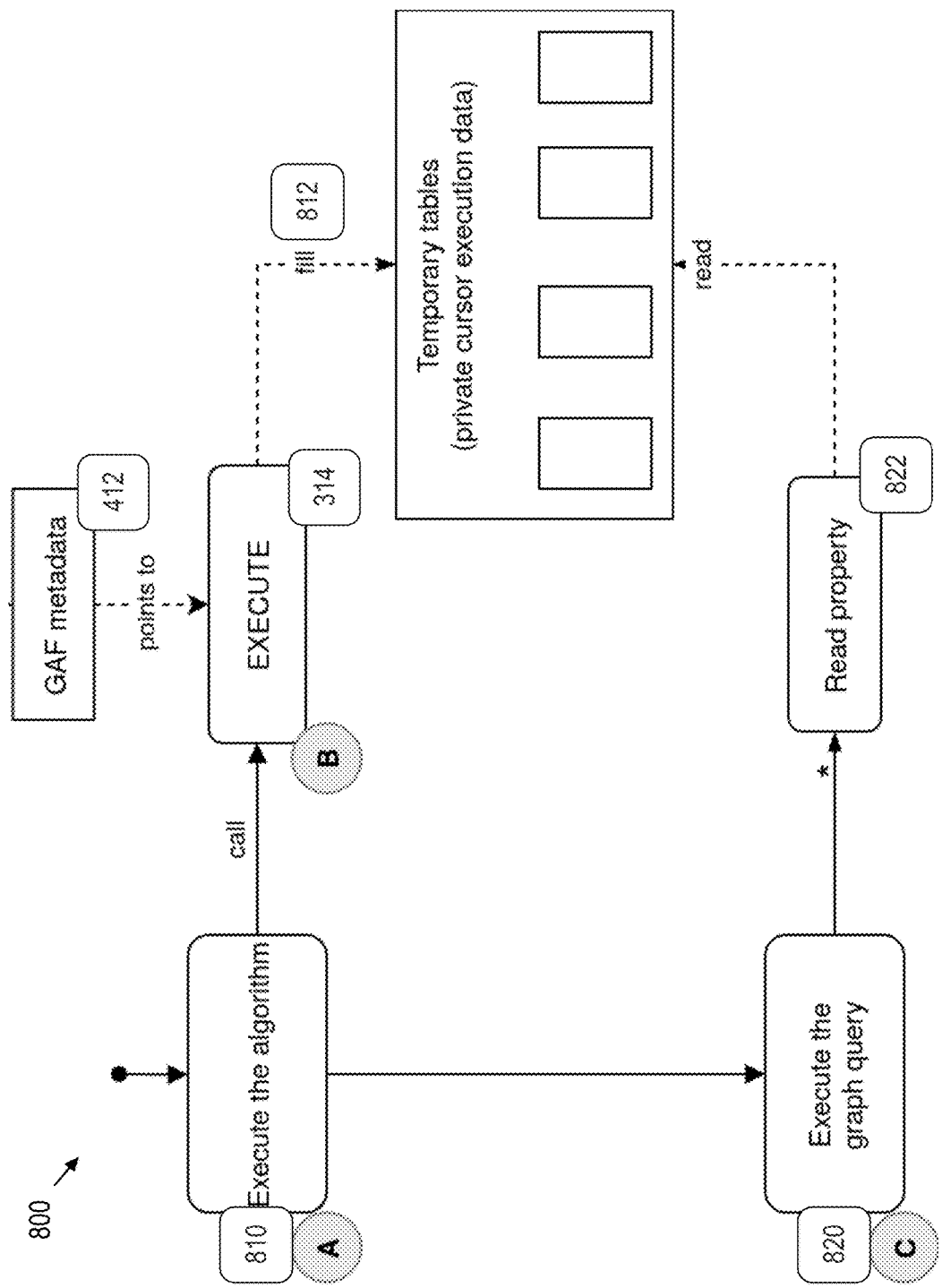
FIG. 8 depicts a flowchart for executing a graph query that includes a GAF.

FIG. 8 depicts a flowchart 800 for executing a graph query that includes a graph algorithm function, such as query 210. Specifically, when executing a graph query containing a GAF, the GAF (e.g., my_algorithm) is executed first (step 810), and subsequently, the graph query is executed (step 820). Note that the labels "A", "B", and "C" in flowchart 800 refer to the row-source tree nodes of FIG. 7A.

6.1. GAF Execution

At step 810 of flowchart 800, the GAF is executed. This step corresponds to GAF row-source 704 of FIG. 7A. For example, after compiling query 210 as described above, RDBMS 110 executes the query. Using the GAF metadata 412 obtained at step 410 of flowchart 400, RDBMS 110 identifies EXECUTE function 314 of example GAF declaration 300, and executes the identified EXECUTE function (corresponding to GAF execution at label "B" in FIG. 7A). EXECUTE function 314 takes, as arguments, definition information for the input graph of the function and mapping data that maps temporary tables in the query cursor (e.g., temporary table 138) to primary tables storing data for the input graph (e.g., primary table 136).

EXECUTE function 314 performs the computation of the GAF, which populates the temporary tables for the query, within private cursor execution data, with computed property values (step 812). Thus, at the end of the computation, all temporary tables for output properties of the GAF have been filled with the results computed by the GAF.

EXECUTE function 314 of the GAF is executed within the same transaction in which the entire cursor is executed. This guarantees that the computation of the GAF has access to a consistent snapshot of database data for the entire duration of the computation. Accordingly, changes made by concurrent data manipulation language (DML) commands to the primary tables are not accessible by the GAF.

6.2. Graph Query Execution

Once EXECUTE function 314 completes, graph query 210 is executed at step 820 of FIG. 8. This step corresponds to graph query row-source 706 of FIG. 7A. The linking of the query execution cursor to temporary tables has already been done at compilation time, so to execute the query, RDBMS 110 simply performs table scans to read the values stored in the temporary tables (step 822). Note that the values read are private to the cursor execution, as described in detail above.

6.3. Garbage Collection

When an execution of the graph query completes, the cursor execution private storage that was allocated for the output and temporary properties is reclaimed. Note that the storage for temporary properties can be reclaimed earlier, e.g., right after the GAF completes execution. This is due to the facts that: (1) temporary properties are private to the GAF's computation and cannot be used in the graph query, and (2) GAFs are entirely executed before beginning execution of the graph query.

7. Composition of Graph Algorithms

Because inline graph algorithms are functions that take a graph as input and return a logical graph object as output, application of such algorithms is effectively closed under the graph database object type. As such, it is possible to include multiple composite GAFs in a query, as depicted by example queries 900 and 910 of FIG. 9. Composition of GAFs is done by supplying, as the graph argument of a GAF (referred to herein as an "outer GAF"), the result of another GAF (referred to herein as an "inner GAF"). In FIG. 9, GAFs 902 and 912 are examples of outer GAFs, and GAFs 904 and 914 are examples of inner GAFs. The innermost GAF has, as its graph argument, an input graph on which to execute (such as input graph objects 906 and 916). Inline GAFs can be nested any number of times, potentially forming deep nested execution chains. For the sake of brevity, the examples in FIG. 9 described herein are limited to two nested GAFs comprising one outer GAF and one inner GAF.

7.1. Use Cases

Query 900 depicts a first use case for composite GAF functions that computes output property values for two GAFs 902 and 904, where a body 908 of query 900 refers to output property values produced by multiple of the composite GAFs. Specifically, inner GAF 904 produces a result2 output property, and outer GAF 902 produces a result1 output property. Body 908 of query 900 refers to both result1 produced by the outer GAF and result2 produced by the inner GAF.

Query 910 depicts a second use case for composite GAF functions that uses the result of inner GAF 914 as an input to outer GAF 912. Specifically, inner GAF 914 produces an inner result output property. Outer GAF 912 utilizes the inner result output property at line 920, and produces an outer result output property. It is noted that body 918 of query 910 refers to outer result produced by the outer GAF and does not refer to inner result produced by the inner GAF.

According to various embodiments, the two use cases may be mixed within a given query. For example, a query may utilize an output property from an inner GAF within an outer GAF, and then refer to output properties of both the inner and outer GAFs in a body of the query.

7.2. Semantics of Composite GAFS

Figure 10:
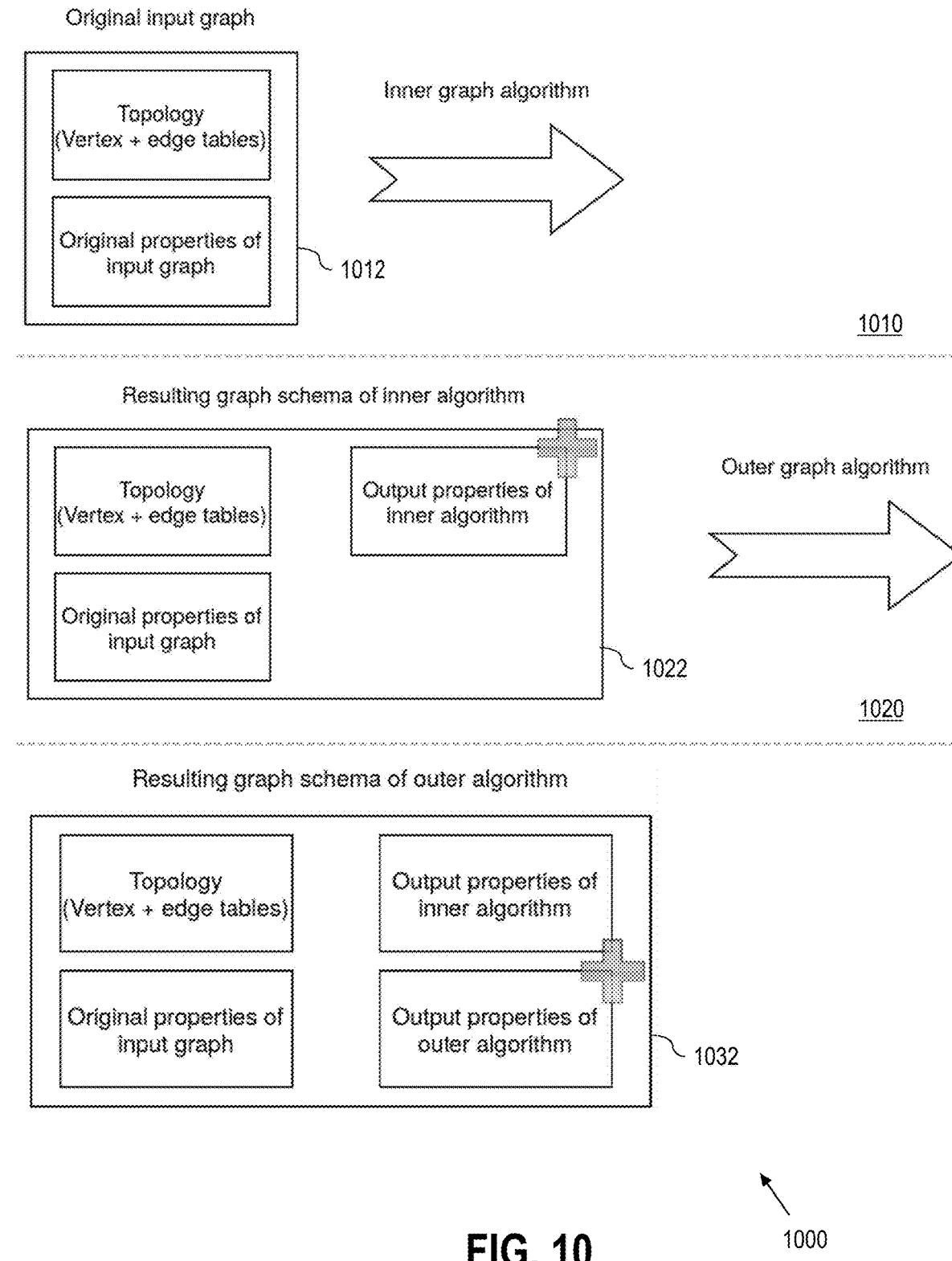
FIG. 10 depicts a progression diagram for graph properties resulting from execution of composite GAFs.

At the semantic level, composition should be understood as executing the inner GAF first, and passing the result of the inner GAF as input to the outer GAF. This semantic of composition means that the outer GAF executes over a graph whose schema is given by the result of the inner GAF. As is described in the regular (non-composite) case above, the graph schema given by the result of the inner GAF is that of the original input graph, plus a set of output properties computed by the inner GAF. This is depicted by progression diagram 1000 of FIG. 10. Specifically, the original input graph schema 1012 (with topology identified in the vertex and edge tables) of diagram 1000 comprises a set of original properties of the graph. At step 1010, the original schema 1012 is processed by the inner GAF to produce a modified graph schema 1022 result. Modified graph schema 1022 comprises the properties of the original graph schema 1012 with the output properties of the inner GAF. The type, name, and kind (vertex or edge) of the output properties of the inner GAF are identified by the DESCRIBE function of the inner GAF.

An outer GAF can use the output properties created by an inner GAF as input properties. The execution of the composition of these GAFs will guarantee that the inner output properties have been computed before they are used by the outer GAF. Note that the primary table(s) of the input graph are unchanged, and remain the same between all nested GAFs. That is, the topology of the input graph object never changes, only GAF-computed output properties are being added to the graph object, as described herein.

The resulting graph schema of the outer-most GAF is that of its input graph plus a set of output properties that the outer-most GAF adds to the graph data. As shown in diagram 1000, at step 1020, modified schema 1022 is processed by the outer GAF to produce a final graph schema 1032 result of the outer GAF, which includes all properties of modified schema 1022 and also the output properties of the outer GAF. The type, name, and kind (vertex or edge) of the output properties of the outer GAF are identified by the DESCRIBE function of the outer GAF. As depicted by diagram 1000, the output graph schema resulting from the composition of two graph GAFs is the original input graph schema plus the output properties added by all nested GAFs. According to various embodiments, the names of the output properties of each GAF are distinct from any output property created by any other GAF referred to in the graph query.

7.3. Semantic Analysis Implications of Composite Gafs

Figure 11A:
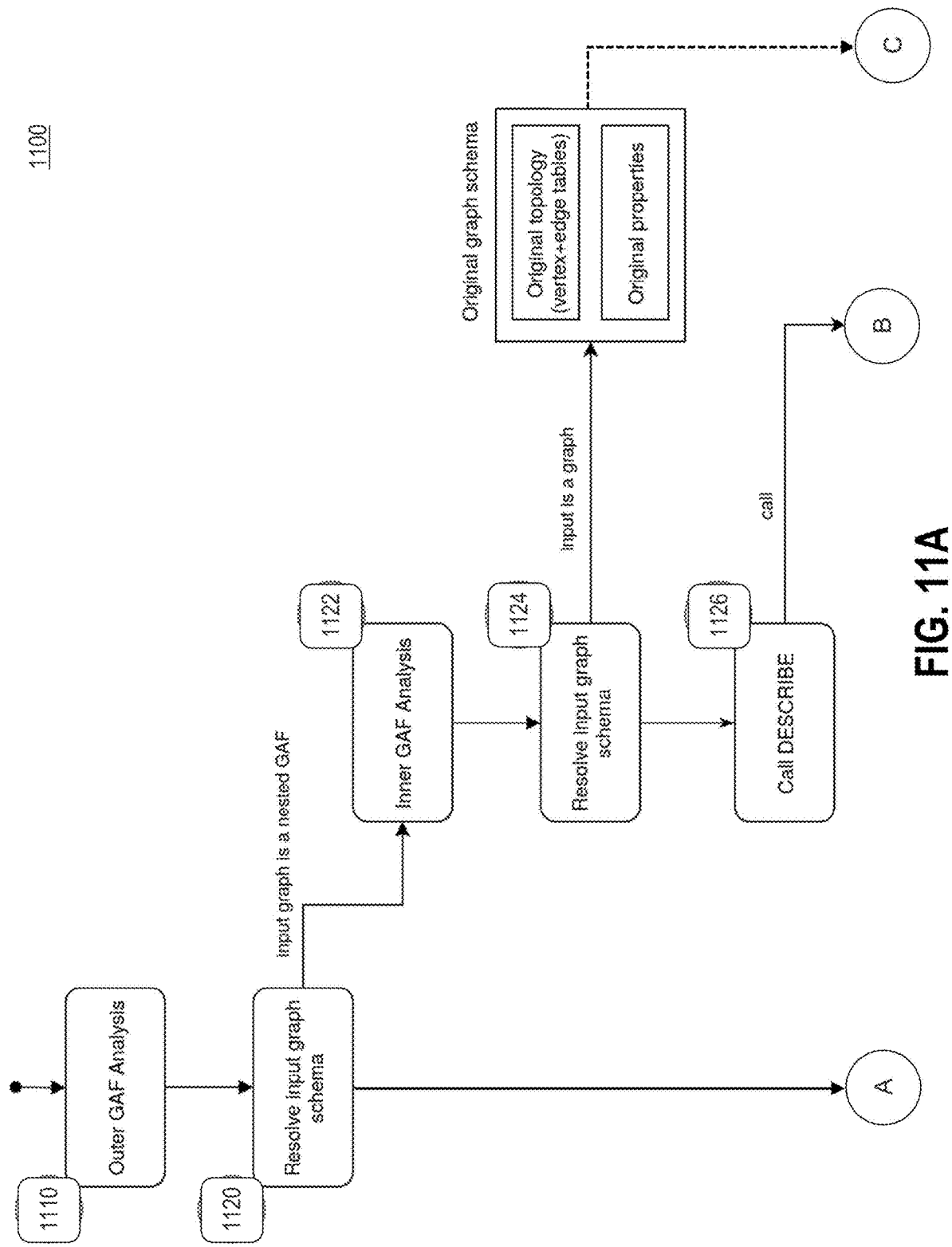
FIGS. 11A-C depict a flowchart for semantic analysis of nested GAF calls.
Figure 11B:
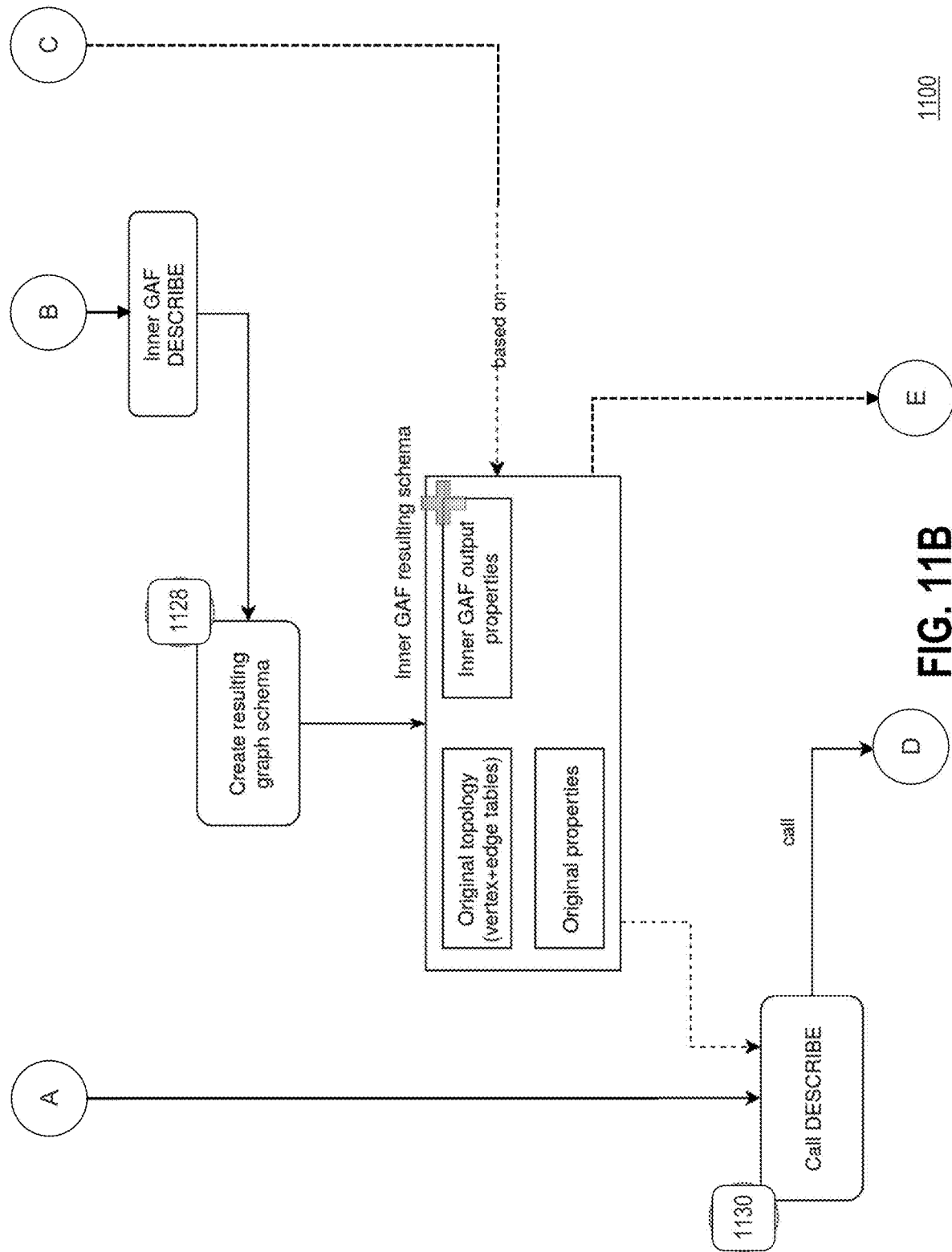
Figure 11C:
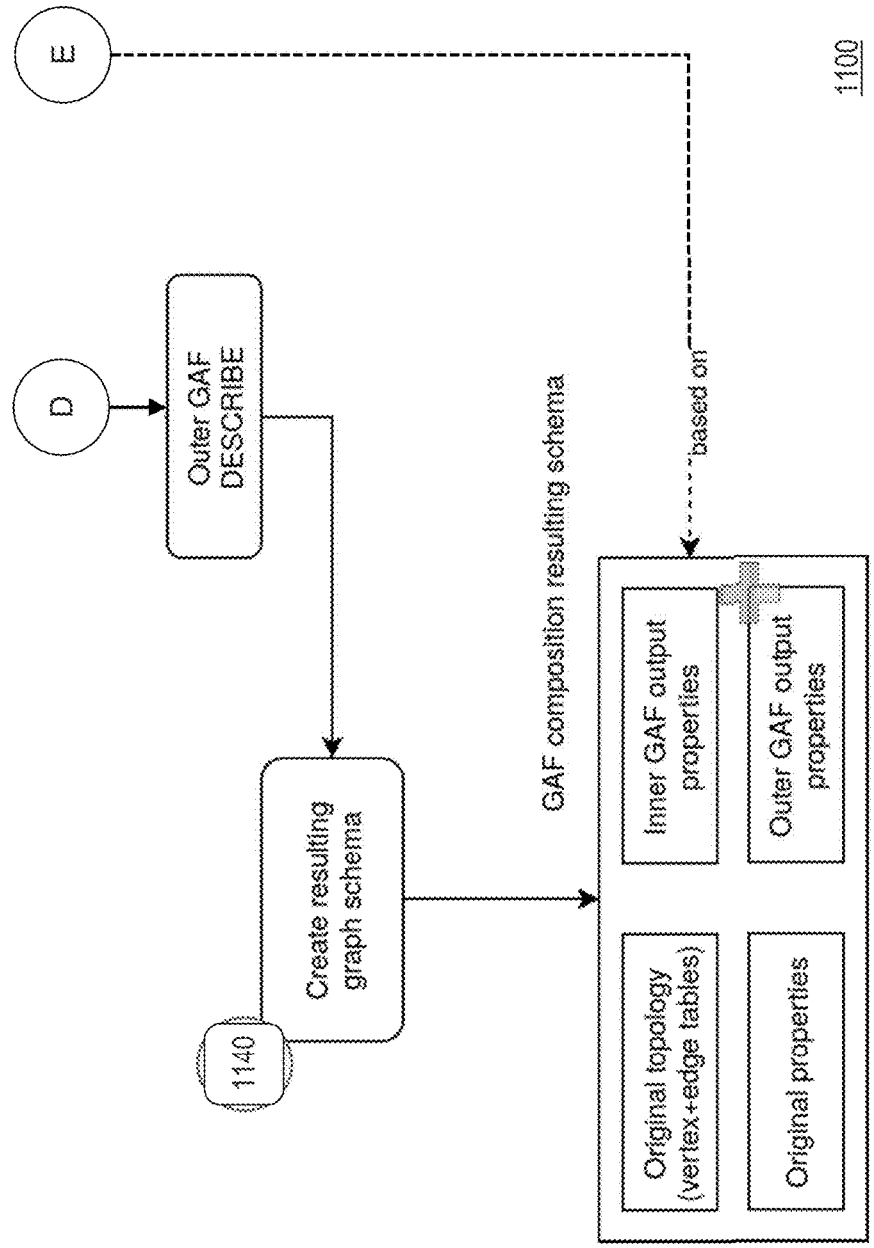

During semantic analysis, the nested GAF calls are processed in a bottom-up fashion, which is depicted by the flowchart 1100 of FIGS. 11A-C. Performing semantic analysis of the top-level GAF call (step 1110) as a result of a top-level semantic analysis call of RDBMS 110 requires processing the graph argument of the outer GAF (step 1120). Because of the presence of a nested GAF invocation in the query being analyzed, at step 1122 of flowchart 1100, semantic analysis is performed on the inner GAF invocation before continuing with analysis of the outer GAF in order to determine the input graph schema for the outer GAF. The resulting schema produced by the outer GAF is then a simple extension of the inner GAF's resulting schema (see step 1140 of flowchart 1100).

The remainder of the semantic analysis process is unchanged, for both the inner and outer GAFs (steps 1126/1128 and 1130/1140 of flowchart 1100). When looking at the input graph definition, the issue of whether the graph definition is an original graph object or an extended graph object schema resulting from a nested GAF call is abstracted away. This way, output properties created by the inner GAF appear as any other property of the graph object within the graph query, and can transparently be used as input properties in an upper-level GAF.

7.4. Execution Impact of Composite Gafs

Figure 12A:
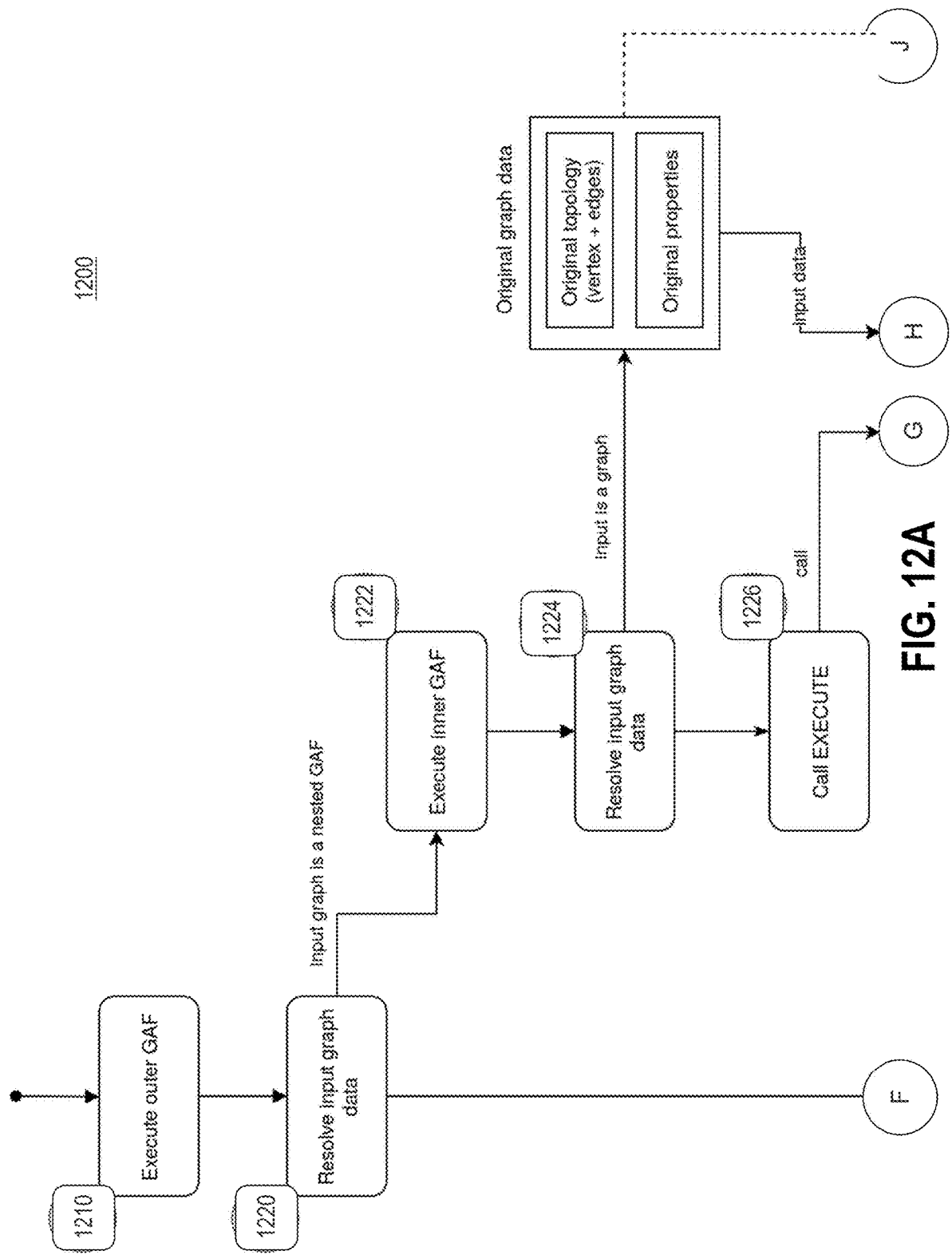
FIGS. 12A-C depict a flowchart for execution of nested GAF invocations.
Figure 12B:
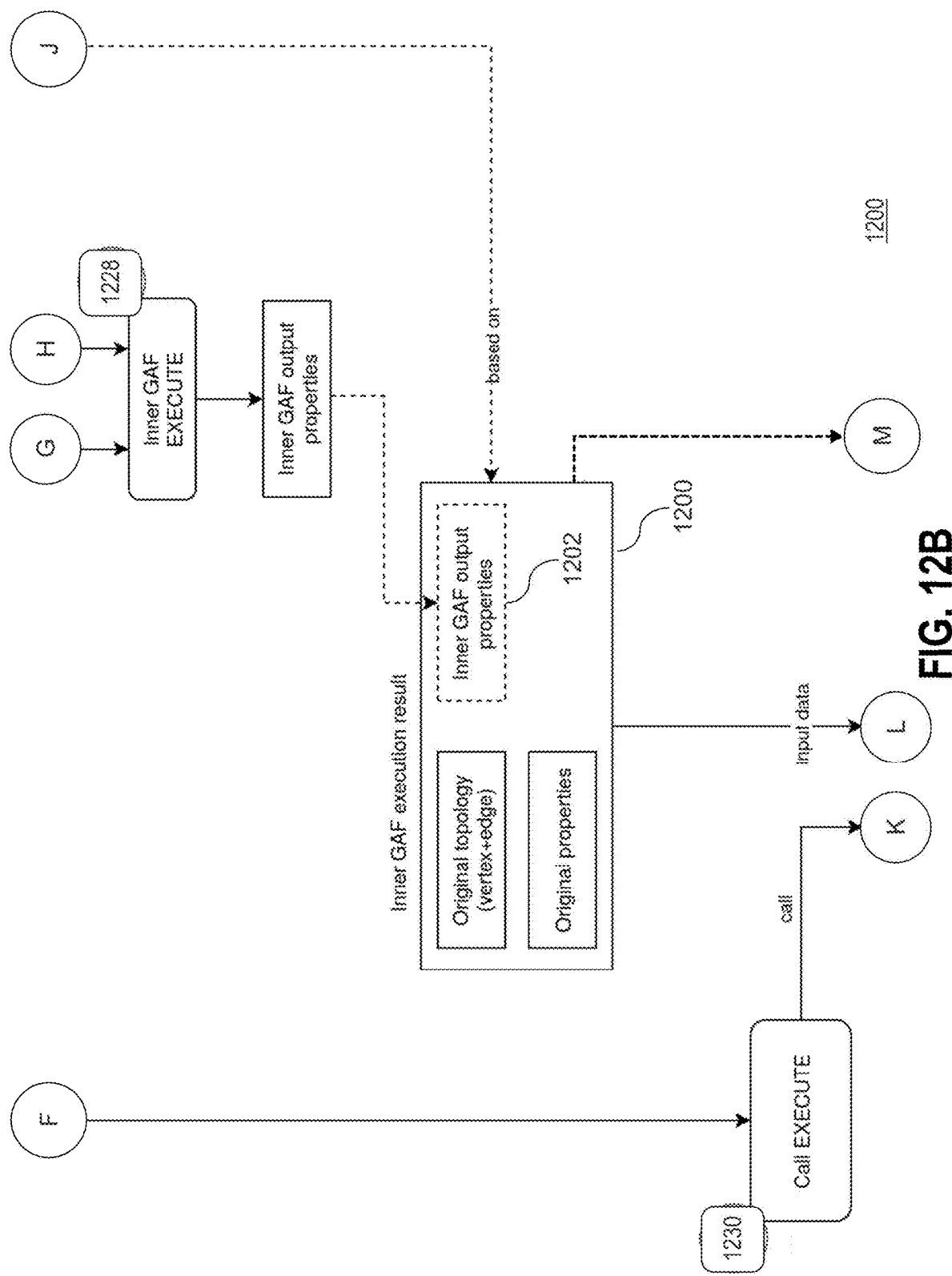
Figure 12C:
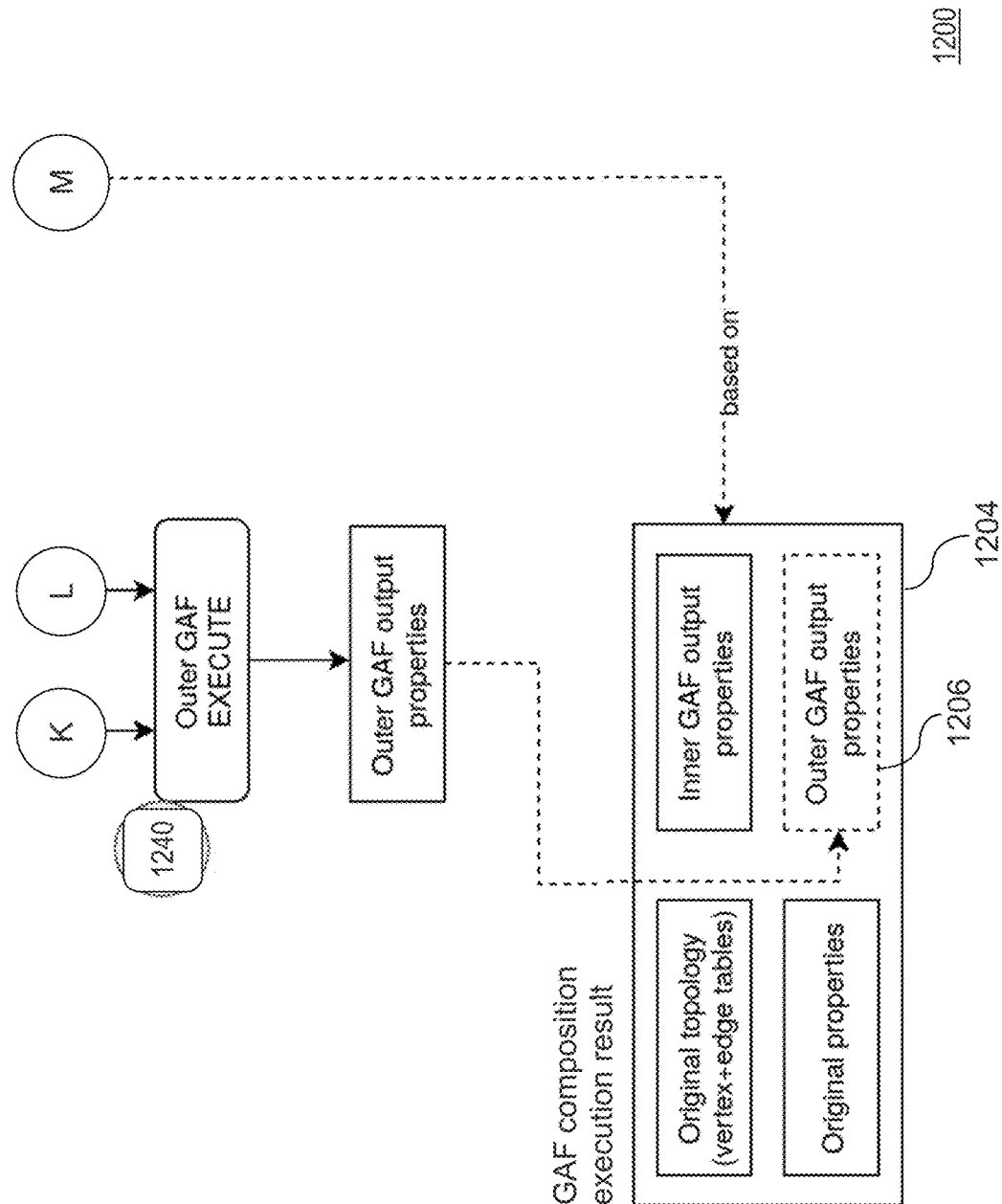

Execution of nested GAF invocations, as depicted by the flowchart 1200 of FIGS. 12A-12C, is performed in the order required by the structure of the nested GAFs. Inner GAFs are executed first (steps 1220/1222 of flowchart 1200), as the computation of the outer GAFs may depend on the result of the inner GAF. This is the case if the outer GAF uses the output properties of the inner GAF as input properties.

Thus, as shown in flowchart 1200, when RDBMS 110 resolves the input graph of an outer GAF (step 1224), the RDBMS determines that the input graph is another (inner) GAF and accordingly executes the inner GAF (steps 1226/1228). In the example of flowchart 1200, there are only two levels of GAF nesting. However, as indicated above, there is no limitation to the number of GAFs that may be nested as described herein.

Execution of the inner GAF causes output properties 1202 of the inner GAF to be stored in temporary tables allocated for the inner GAF, as shown within inner GAF execution result 1200 (FIG. 12B). The data in these temporary tables are not cleared until the end of the query cursor, and as such is available within upper-level GAFs and the graph query. Thus, upper-level GAFs may use output properties of lower-level GAFs (which are executed before the upper-level GAFs) as input properties.

As shown at step 1240 of flowchart 1200, the input graph used in the execution of the outer GAF is the result of the execution of the inner GAF. Execution of the outer GAF causes output properties 1206 of the outer GAF to be stored in temporary tables allocated for the outer GAF, as shown within GAF composition execution result 1204 (FIG. 12C). In this example, GAF composition execution result 1204 is used as the input graph of the graph query by RDBMS 110.

8. Optimizations and Improvements

Various embodiments may employ improvements described below. Some of the improvements described below assume a system wherein graph queries are translated by the query compiler directly into SQL, or into trees of SQL operators. Other improvements benefit systems that use an embedded graph pattern matching engine optimized for main-memory representation of graph index data.

8.1. Cursor Duration Temporary Tables

According to various embodiments, techniques described herein leverage Cursor Duration Temporary Tables (CDTs), which meet the criteria for cursor execution privacy of temporary tables indicated above. Techniques for leveraging CDTs for GAF implementation are described in further detail below. CDTs are for internal use by an RDBMS, and have the following semantics, which distinguishes them from regular tables:

1. Table metadata is bound to a cursor:
   The metadata for CDTs is in-memory only, and is bound to the cursor in which they are used. If the cursor ages out, the table is automatically dropped.
2. Table content is bound to the cursor execution:
   When writing into a CDT, each cursor execution writes its data into a private area, which is not permanent across executions. If the cursor is executed multiple times concurrently, each execution only sees the data that the cursor execution has written in the CDT. Concurrent executions of that cursor do not see the data written into the CDT by other concurrent executions of the cursor. At the end of the cursor execution, the data in the private area is cleaned up automatically. It is possible to more aggressively reclaim the space of CDTs used for temporary properties (as opposed to output properties), e.g., immediately after the last use of the temporary properties. This requires providing an API to the graph algorithm to notify the last use of these properties.
3. Special namespace:
   CDTs are created with specific names that are guaranteed to not conflict with any existing or future table in the database.

CDTs fulfill all of the requirements listed in section 5.1 above ("Use of temporary tables"), and are therefore suitable to be used for inline graph algorithm execution. Furthermore, CDTs implement automatic cleanup, both for the data at the end of the cursor execution, and for the definition of the table if the cursor is dropped. This improves the robustness and safety of the system.

8.2. Statistics and Constraints for the Tables Storing GAF Results

When creating temporary tables during the compilation phase, the RDBMS has knowledge about the content of these tables after execution of the GAF. In particular, the following is known:
1. The key columns $c_1 \ldots c_{(n-1)}$ form a primary key for the temporary table.
2. The key columns $c_1 \ldots c_{(n-1)}$ form a foreign key from the temporary table to the primary table.
3. The distribution of values for each column $c_1 \ldots c_{(n-1)}$ will be the same as the current distribution in the corresponding column in the primary table.
4. The number of rows in the temporary table will be the same as the number of rows in the primary table.
5. None of the columns of the temporary table can contain NULL values.

In order for the query compiler, as well as the SQL optimizer in certain systems, to make optimization decisions for a query plan based on the known information regarding the temporary tables, this information is propagated. This can be done by:
- creating a (non-validated) primary key constraint on the columns $c_1 \ldots c_{(n-1)}$;
- creating a (non-validated) foreign key constraint from the temporary table to its primary table, on the columns $c_1 \ldots c_{(n-1)}$;
- creating (non-validated) NOT NULL constraint on each column of the temporary table;
- providing the optimizer with the statistics on the temporary table, which includes: estimated row count and average row-length, and value distribution for the columns $c_1 \ldots c_{(n-1)}$.

While the GAF is running, and DMLs are issued against the temporary tables, the RDBMS may also gather more precise statistics and feed them back into the query planner.

8.3. Avoiding Joins

In certain cases, it is possible to avoid joins between a primary table and an associated temporary table entirely. This optimization depends on how SQL/PGQ queries are translated to SQL. For example, consider the SQL/PGQ query in the following Table 5, in which the input graph, addresses, has a single vertex table Cities labeled with City and a single edge table Roads labeled with Road. The query returns the rank value of every city reachable from a city named "San Francisco".

TABLE 5

```
SELECT rank
FROM GRAPH_TABLE (
    pagerank (addresses, PROPERTY (rank) ),
    MATCH (a IS City) -[e IS Road]-> (b IS City) WHERE a.name =
        'San Francisco' COLUMNS (b.rank AS rank)
);
```

In a naive translation, the traversal would be performed as a join between the tables Cities and Roads. The rank values would then be accessed via another join with the temporary table, as reflected in the query rewrite in Table 5A below:

TABLE 5A

```
SELECT b_ranks.rank
FROM Cities a, Roads e, Cities b, SYS_TEMP_TABLE b_ranks
WHERE a.name = 'San Francisco'
AND a.cid = e.city1_cid AND b.cid = e.city2_cid
-- traversal a-[e]->b
AND b.cid = b_ranks.cid
-- join with the temporary table
```

In this example, the traversal joins representing a-[e]→b could be performed using the temporary table directly. This eliminates the join between Cities and its temporary table storing the rank values, as shown in the alternate query rewrite in Table 5B below:

TABLE 5B

```
SELECT b_ranks.rank
FROM Cities a, Roads e, SYS_TEMP_TABLE b_ranks
WHERE a.name = 'San Francisco'
AND a.cid = e.city1_cid AND b_ranks.cid = e.city2_cid
-- traversal a-[e]->b_ranks
```

In the general case, a primary table can be replaced by its temporary table if only its primary key and the property stored in the temporary table are needed. More precisely, the query must meet the following criteria: (a) no predicates on properties stored in the primary table are used in the graph query; (b) no properties of the primary table are projected within the graph query; and (c) for all edge relationships in which the primary table is involved, the referenced keys to the vertex tables are its primary keys.

(a) No predicates on properties stored in the primary table are used in the graph query. To illustrate, consider the example GRAPH_TABLE query in Table 6 below, which includes a predicate on a property population of the Cities table of the input graph addresses:

TABLE 6

```
... GRAPH_TABLE (
    pagerank (addresses, PROPERTY (rank) ),
    MATCH (c IS City)
    WHERE c.population >= 20000 COLUMNS (c.rank)
);
```

In this case, the join between the primary table and the temporary table must be performed to filter the vertices based on population whilst projecting the output property, rank, computed by the pagerank GAF, as shown in the query rewrite in Table 6A below:

TABLE 6A

```
SELECT c_ranks.rank
FROM Cities c, SYS_TEMP_TABLE c_ranks
WHERE c.population >= 20000
AND c.cid = c_ranks.cid;
-- join with the temporary table
```

(b) No properties of the primary table are projected within the graph query. To illustrate, consider the example GRAPH_TABLE query in Table 7 below, which projects the name property of the Cities table:

TABLE 7

```
... GRAPH_ TABLE (
    pagerank (addresses, PROPERTY (rank) ),
    MATCH (c IS City)
    COLUMNS (c.name, c.rank)
);
```

The join between the primary table and the temporary table must be performed to retrieve both the name and rank properties, as shown in the query rewrite in Table 7A below:

TABLE 7A

```
SELECT c.name, c_ranks.rank
FROM Cities c, SYS_TEMP_TABLE c_ranks
WHERE c.cid = c_ranks.cid;
```

(c) For all edge relationships in which the primary table is involved, the referenced keys to the vertex tables are its primary keys. Suppose the DDL that defines the addresses graph described above is modified, as follows in Table 8:

TABLE 8

```
CREATE PROPERTY GRAPH_ addresses
VERTEX TABLES ( ... , Cities KEY (cid) ... )
EDGE TABLES ( ... ,
    LivesIn SOURCE ...
    DESTINATION KEY (lives_in_zip) REFERENCES Cities (zipcode)
... );
```

Specifically, in the DDL depicted in Table 8, instead of joining the Persons table with Cities on cid, this join is performed on another column of Cities, zipcode (still unique). The primary key for Cities would remain unchanged, i.e., cid.

The query in the following Table 8A, which returns the rank values of all the cities in which a person named "John Doe" lives, could not benefit from the optimization that replaces a primary table by its temporary table, assuming the definition of the addresses property graph in Table 8:

TABLE 8A

```
SELECT rank
FROM GRAPH_TABLE (
    pagerank (addresses, PROPERTY (rank) ),
    MATCH (a IS Person) -[IS LivesIn]-> (b IS City)
    WHERE a.name = 'John Doe'
    COLUMNS (b.rank AS rank)
);
```

Specifically, the join between the Cities table and its temporary table must be performed for the query in Table 8A in order to get the zipcode column, needed to perform the edgetable join, as depicted in the following query rewrite in Table 8B. Note the column zipcode is not replicated in the temporary table, only cid, which is the defined primary key for the Cities table.

TABLE 8B

```
SELECT b_ranks.rank
FROM Persons a, Cities b, SYS_TEMP_TABLE b_ranks
WHERE a.lives_in_zipcode = b.zipcode
-- join Persons and Cities on zipcode
AND b.cid = b_ranks.cid;
-- join with temporary table
```

Note that this optimization may be done automatically by the SQL query optimizer as a traditional join elimination if there is a PRIMARY KEY and FOREIGN KEY constraint on the temporary table.

8.4. Avoiding Allocating Space for and/or Computing Unused Output Properties A graph query that contains a GAF invocation can be analyzed to determine which output properties are used by the query (or another GAF), and which are not. At a finer grain, the heterogeneous nature of the query can also help to identify which <output property/primary table> pairs are used by the query invoking the GAF. This information indicates which temporary tables must be filled with data at the end of the GAF, and which ones can be omitted from calculation. Specifically, <output property/primary table> pairs that are not used in the graph query do not need to be computed. The information regarding one or more unused output properties may be passed into the EXECUTE function of the GAF.

Furthermore, the information regarding unused <output property/primary table> pairs can be used to avoid creating temporary tables at compile-time for the unused pairs and/or to avoid the step of inserting an unused calculated output property into the temporary table. Otherwise, this information can be used at runtime to guide which output property to compute for which primary table. Whether to perform this optimization at compile-time or at runtime depends on the system being implemented.

The information regarding unused output properties may also be used to aggressively reclaim space in the temporary tables allocated for the unused output properties at end of GAF execution as opposed to at the end of the cursor execution.

8.5. Storing More than One Property in Temporary Tables

Embodiments described above assume that temporary tables store exactly one output or temporary property computed by a GAF. Thus, the schema of the temporary tables always includes the primary key information of the primary table, plus one column for the GAF-computed property values (see section 5.2, "Creation of temporary tables").

It is also possible to create temporary tables such that they store more than one GAF-computed property at a time. The lifetime of output and temporary properties being slightly different, it would seem natural to want to separate those kinds of properties, but nothing prevents storing both output and temporary properties in the same temporary table and reclaiming storage for both types of properties at the same time.

For example, FIG. 13 depicts a primary table 1300 and a temporary table 1310 that stores more than one GAF-computed property, including example output properties result1_GAF and COMP_ID, and temporary property TMP1, as well as key columns that are a foreign key to primary table 1300.

Storing more than one GAF-computed property in a temporary table is a trade-off, as it has advantages and drawbacks. One benefit is that storing more than one GAF-computed property in the temporary tables results in creation of fewer temporary tables. This can help reduce the compilation time of a query if creating such a table is a heavy operation, and reduces the metadata overhead of each cursor.

Furthermore, consolidating GAF-computed properties into fewer temporary tables uses less space to replicate the primary key of the primary table. Indeed, each temporary table has columns that store the primary key data of a corresponding primary table. The values of this primary key are therefore copied once per temporary table. Having fewer temporary tables means less replication of the primary key values, and therefore less space used to store the GAF-computed values.

Finally, storing more than one property in a temporary table may also reduce the number of joins needed to perform the graph query. This is illustrated based on an example query in Table 9 below. Note that this benefit is dependent on the query, specifically, on whether multiple output properties are used together. The benefit also depends on access patterns inside the GAF's computation.

TABLE 9

SELECT *
FROM GRAPH_TABLE (
   some_gaf (g, PROPERTY
   (A), PROPERTY
   (B) )
MATCH (V)
COLUMNS (v.A, v.B) );

Table 9A below depicts an equivalent SQL query, to the query in Table 9, when storing properties in separate temporary tables:

TABLE 9A

SELECT A, B
FROM TEMP_TABLE_A,
   TEMP_TABLE_B
ON TEMP_TABLE_A.ID =
   TEMP_TABLE_B.ID;
--This requires a join on the primary key.

Table 9B below further depicts an equivalent SQL query when storing properties A and B in the same temporary table:

TABLE 9B

SELECT A, B
FROM TEMP_TABLE_A_B;
--This does not require any join.

The drawbacks of storing multiple GAF-computed properties in the same temporary table mostly depend on how GAFs are executed, and specifically, how they write into the temporary tables.

In a system that stores each property individually, replacing the entire content of a property can be efficiently performed by doing a TRUNCATE (or DELETE*, depending on the supported operations of the RDBMS) followed by a bulk INSERT (e.g., INSERT/*+APPEND*/in Oracle). In a system that stores multiple GAF-computed properties in the same table, replacing the entire content of only one GAF-computed property would need to be executed as an UPDATE statement, which is much less performant.

This is just one example among many such access patterns. Note that GAFs are generally implemented as iterative processes, and as such, they very frequently replace the entire content of a property, which makes this example drawback relevant.

8.6. In-Memory Temporary Tables

A system that supports temporary tables (as described in section 5.1, "Use of temporary tables", above) that are kept in main memory instead of on disk may maintain the temporary tables in memory, which allows for efficient access to the table data. Generally, the content of these in-memory tables can spill to disk if the intermediate result is too large. Spilling in-memory tables to disk can avoid the entire system running out of memory, which is extremely important in a multi-session environment.

8.7. Using Unique Identifiers from a Main-Memory Graph Representation

In a system that supports building and maintaining an efficient main-memory representation of a graph database object, each tuple of the vertex and edge tables is effectively mapped to a unique identifier used in said main-memory graph representation. In such a system, the primary key columns of the temporary tables used to store GAF-computed properties can be replaced with a single column storing these unique identifiers. When performing joins with the primary tables, the joins can be performed on this unique identifier instead of on the values of the primary key. This is made possible by the existence of a one-to-one mapping between the tuples of the primary tables and the unique identifiers used in the main-memory representation of the graph.

This optimization could reduce the space consumption of the temporary tables if the unique identifier used in the main-memory representation of the graph is more compact than the primary key of the corresponding vertex or edge table. This is the case, for example, if said primary key is composed of multiple columns, or if the primary key is a single column whose type representation is large (e.g., VARCHAR2). For similar reasons and in similar scenarios, this optimization can improve the performance of a join operation.

8.8. Parallel Execution of Independent Nested GAFS

In case nested GAF executions are independent of one another, the composite GAFs can be executed in parallel, reducing global computation time. The only dependencies in this model arise if an outer GAF, "F1", uses the output properties of an inner GAF, "F2", (at any level below F1) as an input property. In this scenario, F2 must be computed before F1, as the input of F1 also contains the output of F2.

Using the knowledge of which GAF produces which output properties, and which GAF uses which properties as input properties, it is possible to create a dependency graph between composite GAFs. In such a dependency graph, if F1 depends on F2, then F1 uses the result of F2 as input, and thus F2 must be executed before F1. Once this dependency graph is built, an execution order for the composite GAFs may be determined. GAFs that do not have a direct dependency between each other may be executed in parallel (once all of the GAFs they depend on have been executed).

Figure 14A:
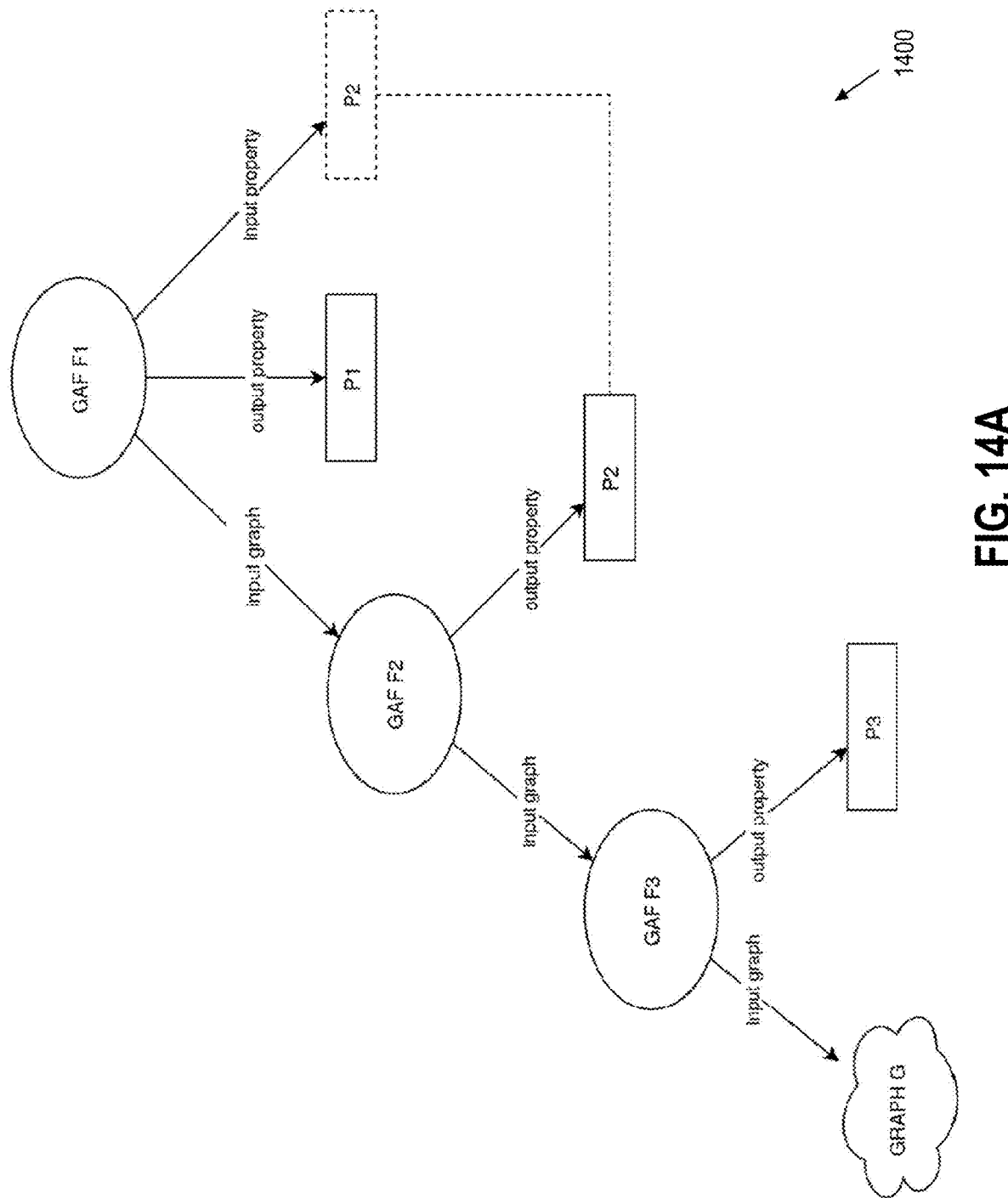
FIG. 14A depicts an example query flowchart that includes three composite GAFs.

To illustrate, FIG. 14A depicts an example query flowchart 1400 that includes three composite GAFs: F1 (outer GAF), F2 (mid-level GAF), and F3 (inner GAF). Dependency graph 1410 of FIG. 14B depicts the dependencies of the GAFs regarding input and output properties, where F1 uses an output property of F2 as an input property, and F3 does not use any output properties of F1 or F2 as input properties. Thus, query plan 1420 of FIG. 14B depicts execution of F2 and F3 in parallel, with execution of F1 initiating upon completion of execution of F2.

9. Graph Processing Systems

A graph is a data structure used to model relationships between entities. A graph consists of a set of vertices (corresponding to entities) and a set of edges (corresponding to relationships). When data for a specific application has many relevant relationships, the data may be represented by a graph. Herein, vertices and edges of a graph may be referred to generically as "components" of the graph, where a "component" of a particular graph is either a vertex or an edge of the particular graph.

Graph processing systems can be split in two classes: graph analytics and graph querying. Graph analytics systems have a goal of extracting information hidden in the relationships between entities, by iteratively traversing relevant subgraphs or the entire graph. Graph querying systems have a different goal of extracting structural information from the data, by matching patterns on the graph topology.

9.1. Graph Pattern Matching

Figure 15A:
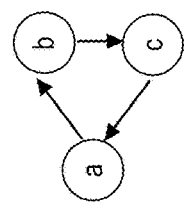
FIG. 15A illustrates an example graph and an example target pattern.

Graph pattern matching refers to finding subgraphs, in a given directed graph, that are homomorphic to a target pattern. FIG. 15A illustrates an example graph and an example target pattern. If the target pattern is (a)→(b)→(c)→(a), then corresponding graph walks or paths of FIG. 15A are the following:

(1)→(2)→(3)→(1),
(2)→(3)→(1)→(2), and
(3)→(1)→(2)→(3).

One hop corresponds to a graph walk consisting of a single edge. A walk with n edges is considered as a n-hop pattern.

9.2. Translation from Relational Model to Property Graph Model

Figure 15B:
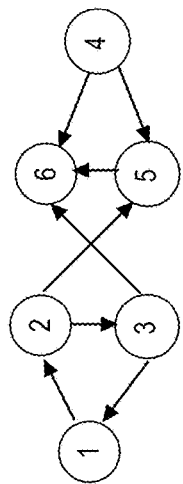
FIG. 15B illustrates an example property graph.

A property graph data model allows vertices and edges in a graph to have arbitrary properties as key-value pairs. FIG. 15B illustrates an example property graph. The property graph in FIG. 15B represents contact relationships between persons. The persons have name and age properties, while the relationships have a property indicting the age at which the subject knew the other person.

Figure 15C:
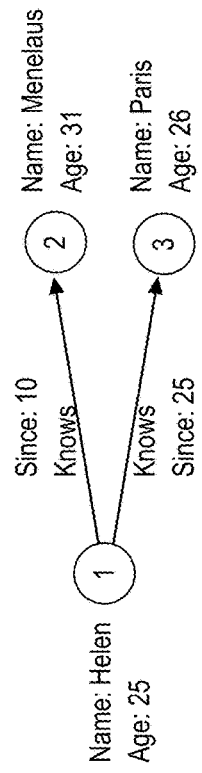
FIG. 15C illustrates example tables associated with the graph of FIG. 15B.

Conceptually, a RDBMS may be interpreted in a graph model. For example, all vertices and their properties may be grouped in a vertex table, while all relationships and their properties may be grouped in an edge table. As an example, the graph illustrated in FIG. 15B may be stored in a RDBMS as tables, as illustrated FIG. 15C. Each vertex has a unique identifier (i.e., Via) in the vertex table (i.e., Persons table) where it is stored. Similarly, each edge has a unique identifier (i.e., $E_{id}$) in the edge table (i.e., Knows table) where it is stored. The edge table can be used for matching patterns; the vertex and edge tables can then be used for accessing the desired information when the pattern is matched. The RDBMS keeps track of the referenced tables by each edge table, in order to be able to reconstruct the graph structure.

9.3. High-Level Design

In an embodiment, graph pattern query processing is performed in a first phase and a second phase. The first phase includes a SQL/PGQ parser and a semantic analyzer. The SQL/PGQ parser identifies tokens from an input string (e.g., graph pattern query text) to construct an intermediate representation, which can be used by the second phase. The semantic analyzer generates a list of validated pattern specializations. The semantic analyzer may include a type checker configured to catch user errors at a graph query level. The second phase includes a SQL translator and uses a SQL compiler. The SQL translator generates a single or main SQL query (e.g., SQL UNION ALL text) from the specializations. The compiler builds row-sources logically as an in-lined view processing.

A graph pattern query is a query that specifies a pattern of connected vertices and edges to match within a graph. A graph pattern query may be a statement that conforms to a graph query language. Examples of a graph query language include PGQL, GQL, and Gremlin. PGQL is described in PGQL 1.3 Specification, 24 Mar. 2020, the contents of which are incorporated herein by reference. Gremlin is described in Apache TinkerPop, 3.4.8, TinkerPop Documentation. GQL is being developed by ISO/IEC JTC 1/SC 32 WG3.

Graph data is stored in a set of relational tables inside the RDBMS and there may be in-memory graph representation of the data. On top of the relational tables may be defined a native graph view. This may be achieved via execution of a DDL statement on top of the relational tables to create a graph from the relational tables. The graph may be stored in a property graph model or schema. The DDL statement classifies data tables into vertex tables and edge tables. Every vertex and edge table exposes a set of columns (called properties) which are grouped into a label. A label can be shared by multiple vertex/edge tables.

A key of a vertex table identifies a unique vertex in the graph. The one or more columns to use as a key can be specified in the DDL statement; the one or more columns specified need not be defined as a primary vertex table. If no vertex table column is specified as a key, then the default key is the primary key of the vertex table. A key of an edge table unique identifies an edge in the KEY clause when specifying source and destination vertices uniquely identifies the source and destination vertices. A key of an edge table can be defined in similar manner as for a vertex table.

The DDL statement allows the user to define the graph as a first-class citizen inside the database, which enables a compilation mechanism of graph pattern queries to use graph specific optimizations.

When a graph pattern query is run over the graph data, the SQL/PGQ parser, the semantic analyzer, and the SQL translator convert an input graph pattern query and output a single or main SQL query that can be executed on top of an RDBMS supporting SQL execution. The RDBMS converts the graph pattern query to a SQL query over the relational tables.

The SQL/PGQ parser, the semantic analyzer, and the SQL translator are each discussed below.

9.4. SQL/PGQ PARSER

An input to the SQL/PGQ parser is an original graph pattern query. The parser uses the language grammar to identify tokens in the input string and constructs an intermediate representation that is used in subsequent steps or phases. An intermediate representation is a collection of one or more trees, representing a path pattern of the graph pattern query, with label constraints for all graph pattern variables in the original query text. Each graph pattern variable is represented as a node or a link in the intermediate representation. For example, each graph pattern variable associated with a vertex table is represented as a node, and each graph pattern variable associated with an edge table is represented as a link in the intermediate representation. Each of the nodes and links in the intermediate representation has a label constraint from the original graph pattern query text.

9.5. Semantic Analyzer

Since the graph pattern query is based on the property graph model, the graph pattern variables are bound to labels and not to actual data tables. In an embodiment, the semantic analyzer computes a set of valid assignments between every graph pattern variable and an underlying data table. A valid assignment of all path variables to data tables is called a pattern specialization. A set of valid assignments is called a list of pattern specializations.

Pattern specializations are generated by first generating a mapping between every variable and its label by referencing the graph metadata. Once a valid set of labels is generated for every variable, a type-checking phase to type check expressions may start. The type-checking phase is described in the Type Checking section below.

Every label is then resolved to the set of data tables on top of which it is defined. A variable can be bound to multiple labels or label expressions. In this case, all the tables spanned by those labels or by the label expression are resolved. This information is fetched from the graph metadata.

For every variable in the previous mapping, a table name is picked to generate a new mapping (called specialization) where every variable is bound to a single table name. The mapping is then validated against the graph metadata. The validation includes pruning specializations which are corresponding to non-existing connections in the graph.

9.6. SQL Translator

The result of the pattern specialization phase is a list of pattern specializations that have been validated against the graph metadata. The SQL translator transforms each pattern specialization into an individual SQL query block. Once generated, individual SQL query blocks are union-ed via UNION ALL clause to generate a single or main SQL query.

In an embodiment, a pattern specialization is first transformed into a FROM clause. Second, a SELECT clause is generated from the COLUMNS clause of the original graph pattern query. Projected property names qualified with pattern variable are replaced with column name qualified by the original table name. Third, the WHERE clause is copied from the WHERE clause of the original graph pattern query. Property names in the graph pattern query are replaced with actual column names on the original data table. Lastly, the JOIN condition between the data tables is added and it is concatenated with the rest of the WHERE clause. The primary keys and foreign keys columns for each JOIN are looked up in the graph metadata that stores information.

9.7. Type Checking

In an embodiment, expressions may be type checked at the graph query level. One reason is early detection of type errors and easy display. Errors are generated before a generated SQL is type checked. By type checking at the graph query level, there is no need to map errors generated on the generated SQL in the original graph pattern query string. Type expressions are checked at SQL/PGQ level. The type of a property is determined based on the label from where it comes.

The type-checking phase may be triggered in the semantic analysis phase, after the mapping between every variable and its label is generated. At that time, every variable in the graph pattern query and a valid set of labels to which it can be bound are obtained or otherwise determined, as discussed above.

For example, for every expression in the graph pattern query,
 obtain a SQL abstract syntax tree (AST);
 for every property access in this AST, find the type of the property based on the labels to which the variable is bound. The type of a property from a label is stored in the graph metadata such that a simple look up is able to retrieve the type. If a variable is bound to multiple labels, then multiple types are retrieved, and their UNION compatible type is determined. A UNION compatible type is a data type that is comparable with and subsumes the multiple types being compared. For example, VARCHAR and NUMBER are not comparable. However, NUMBER and BINARY DOUBLE are comparable; the UNION compatible type of NUMBER and BINARY DOUBLE is BINARY DOUBLE. Another example of a UNION compatible type is a JSON data type, which supports schema-flexible property graph usage. If no valid type can be found, then an error is thrown. Otherwise, the UNION compatible type is injected in the property access node.

A normal SQL type-checker is called on this AST.

The type of every property is stored in the property access node. When generating the SQL, this type is used to add casts in order to enforce the type. The type-checking phase is done before pattern specializations are created such that the type of the expression change does not depend on the MATCH pattern.

9.8. Processing Expressions Over Vertex/Edge Properties

A graph DDL may allow definition of properties as expressions over vertex and edge properties. The expressions are defined over columns of the schema object used to define edge or vertex properties. The expression may use columns not exposed directly as property.

This has the several benefits. First, the underlying optimizations in the RDBMS for processing expressions over columns can be directly leveraged. When generating the SQL text, any reference of "my_exp" is replaced with the actual expression "age+bonus". The SQL compiler will then be able to leverage any potential existing virtual column/optimization that applies to the "age+bonus" expression. In addition, support for UN-structured data types, such as JSON/XML, of the underlying RDBMS can be leveraged. For example, users can include in their graph properties defined over JSON/XML columns.

10. Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create, configure and define database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

An SQL statement includes one or more query blocks. A query block is the basic unit of a SQL statement that specifies a projection operation (e.g. columns specified in a SELECT clause) on a row-source (i.e. table, inline view, view referenced by a FROM clause), and may specify additional operations on the row-source such as joining and grouping. A query block may be nested within another "outer" query block. A nested query block may be a subquery or inline view. A query block may be an argument to the UNION clause along with another query block, as illustrated by SQL statements described earlier.

A database is defined by a database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access or execute the database objects that are defined by the dictionary. Such database objects may be referred to herein as first-class citizens of the database.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

10.1. Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row-sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row-source performs operations on input rows and generates output rows, which may serve as input to another row-source. The output rows may be new rows, and or a version of the input rows that have been transformed by the row-source.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
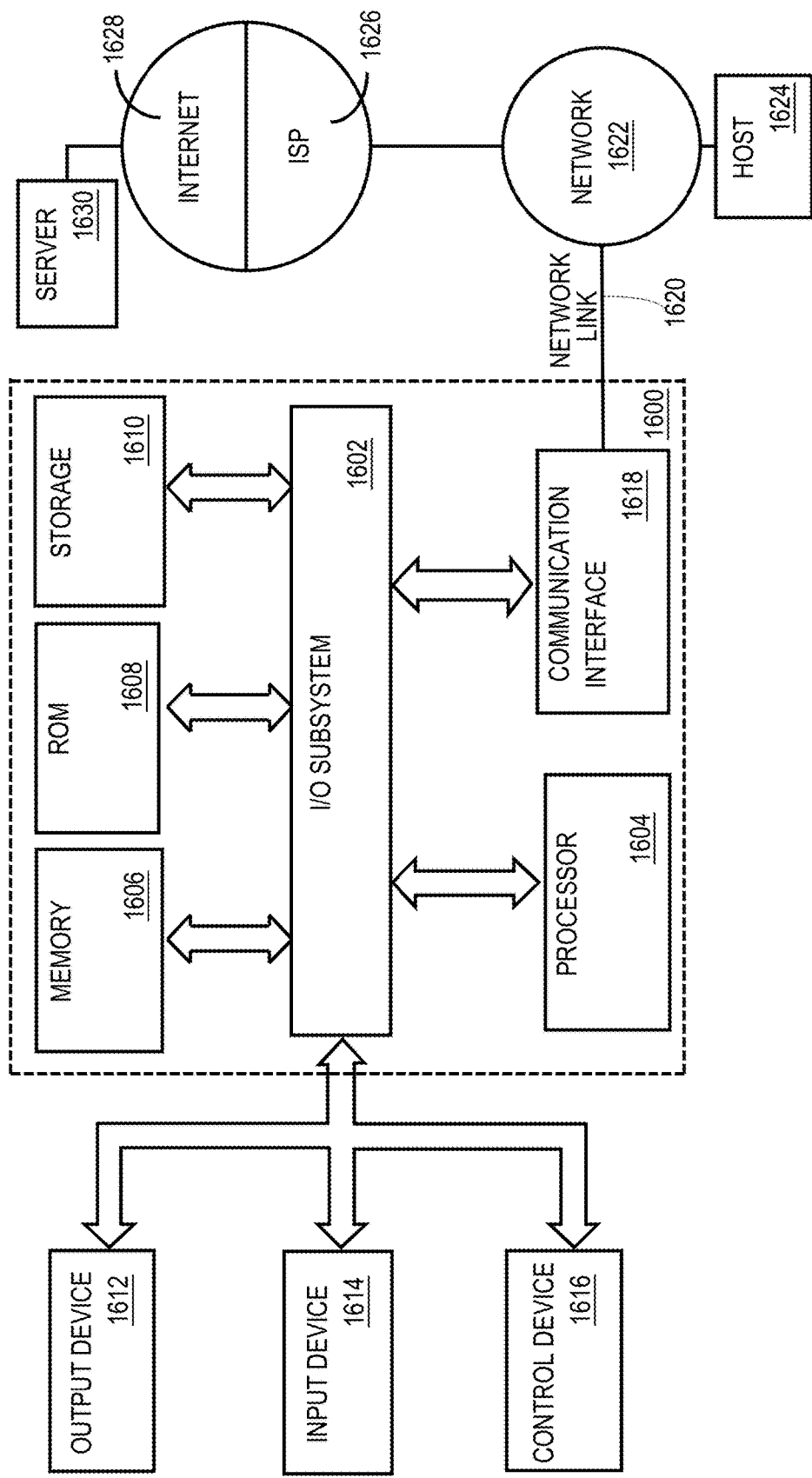
FIG. 16 illustrates a block diagram of a computing device in which the example embodiment(s) of the present invention may be embodiment.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general-purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk, optical disk, or solid-state drive is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1610. Volatile media includes dynamic memory, such as main memory 1606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid-state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic, or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the worldwide packet data communication network now commonly referred to as the "Internet" 1628. Local network 1622 and Internet 1628 both use electrical, electromagnetic, or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

12. Software Overview

Figure 17:
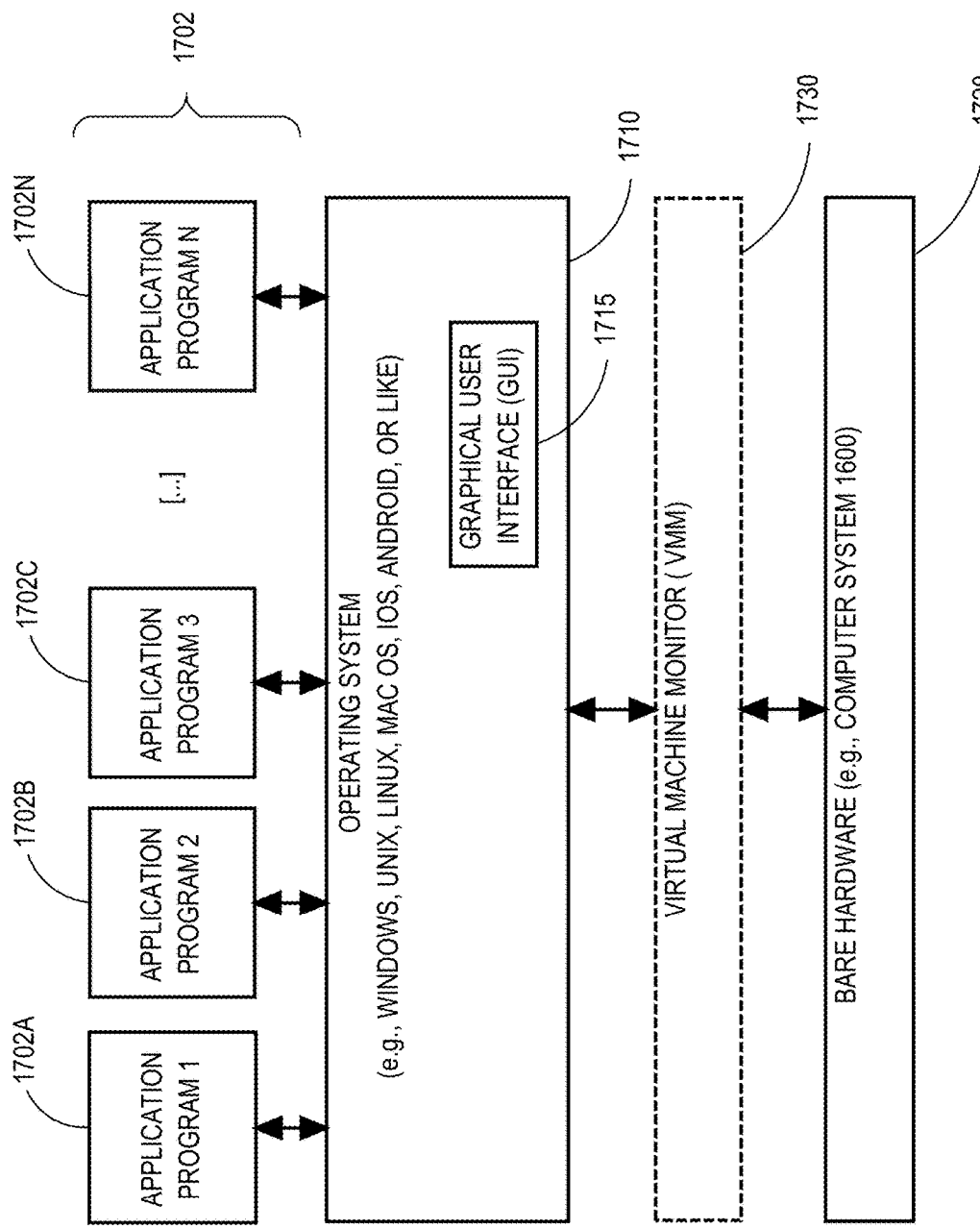
FIG. 17 illustrates a block diagram of a basic software system for controlling the operation of a computing device.

FIG. 17 is a block diagram of a basic software system 1700 that may be employed for controlling the operation of computing device 1600. Software system 1700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1700 is provided for directing the operation of computing device 1600. Software system 1700, which may be stored in system memory (RAM) 1606 and on fixed storage (e.g., hard disk or flash memory) 1610, includes a kernel or operating system (OS) 1710.

The OS 1710 manages low-level aspects of computer operation, including managing execution of processes, memory allocation, file input and output (I/O), and device I/O. One or more application programs, represented as 1702A, 1702B, 1702C . . . 1702N, may be "loaded" (e.g., transferred from fixed storage 1610 into memory 1606) for execution by the system 1700. The applications or other software intended for use on device 1700 may also be stored as a set of downloadable computer-executable instructions, for example, for downloading and installation from an Internet location (e.g., a Web server, an app store, or other online service).

Software system 1700 includes a graphical user interface (GUI) 1715, for receiving user commands and data in a graphical (e.g., "point-and-click" or "touch gesture") fashion. These inputs, in turn, may be acted upon by the system 1700 in accordance with instructions from operating system 1710 and/or application(s) 1702. The GUI 1715 also serves to display the results of operation from the OS 1710 and application(s) 1702, whereupon the user may supply additional inputs or terminate the session (e.g., log off).

OS 1710 can execute directly on the bare hardware 1720 (e.g., processor(s) 1604) of device 1600. Alternatively, a hypervisor or virtual machine monitor (VMM) 1730 may be interposed between the bare hardware 1720 and the OS 1710. In this configuration, VMM 1730 acts as a software "cushion" or virtualization layer between the OS 1710 and the bare hardware 1720 of the device 1600.

VMM 1730 instantiates and runs one or more virtual machine instances ("guest machines"). Each guest machine comprises a "guest" operating system, such as OS 1710, and one or more applications, such as application(s) 1702, designed to execute on the guest operating system. The VMM 1730 presents the guest operating systems with a virtual operating platform and manages the execution of the guest operating systems.

In some instances, the VMM 1730 may allow a guest operating system to run as if it is running on the bare hardware 1720 of device 1600 directly. In these instances, the same version of the guest operating system configured to execute on the bare hardware 1720 directly may also execute on VMM 1730 without modification or reconfiguration. In other words, VMM 1730 may provide full hardware and CPU virtualization to a guest operating system in some instances.

In other instances, a guest operating system may be specially designed or configured to execute on VMM 1730 for efficiency. In these instances, the guest operating system is "aware" that it executes on a virtual machine monitor. In other words, VMM 1730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

FIG. 17 is a block diagram of a basic software system 1700 that may be employed for controlling the operation of computer system 1600. Software system 1700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1700 is provided for directing the operation of computer system 1600. Software system 1700, which may be stored in system memory (RAM) 1606 and on fixed storage (e.g., hard disk or flash memory) 1610, includes a kernel or operating system (OS) 1710.

The OS 1710 manages low-level aspects of computer operation, including managing execution of processes, memory allocation, file input and output (I/O), and device I/O. One or more application programs, represented as 1702A, 1702B, 1702C . . . 1702N, may be "loaded" (e.g., transferred from fixed storage 1610 into memory 1606) for execution by the system 1700. The applications or other software intended for use on computer system 1600 may also be stored as a set of downloadable computer-executable instructions, for example, for downloading and installation from an Internet location (e.g., a Web server, an app store, or other online service).

Software system 1700 includes a graphical user interface (GUI) 1715, for receiving user commands and data in a graphical (e.g., "point-and-click" or "touch gesture") fashion. These inputs, in turn, may be acted upon by the system 1700 in accordance with instructions from operating system 1710 and/or application(s) 1702. The GUI 1715 also serves to display the results of operation from the OS 1710 and application(s) 1702, whereupon the user may supply additional inputs or terminate the session (e.g., log off).

OS 1710 can execute directly on the bare hardware 1720 (e.g., processor(s) 1604) of computer system 1600. Alternatively, a hypervisor or virtual machine monitor (VMM) 1730 may be interposed between the bare hardware 1720 and the OS 1710. In this configuration, VMM 1730 acts as a software "cushion" or virtualization layer between the OS 1710 and the bare hardware 1720 of the computer system 1600.

VMM 1730 instantiates and runs one or more virtual machine instances ("guest machines"). Each guest machine comprises a "guest" operating system, such as OS 1710, and one or more applications, such as application(s) 1702, designed to execute on the guest operating system. The VMM 1730 presents the guest operating systems with a virtual operating platform and manages the execution of the guest operating systems.

In some instances, the VMM 1730 may allow a guest operating system to run as if it is running on the bare hardware 1720 of computer system 1600 directly. In these instances, the same version of the guest operating system configured to execute on the bare hardware 1720 directly may also execute on VMM 1730 without modification or reconfiguration. In other words, VMM 1730 may provide full hardware and CPU virtualization to a guest operating system in some instances.

In other instances, a guest operating system may be specially designed or configured to execute on VMM 1730 for efficiency. In these instances, the guest operating system is "aware" that it executes on a virtual machine monitor. In other words, VMM 1730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

13. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

14. Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
a database management system (DBMS) maintaining a database that stores a particular graph object that defines a plurality of vertices and a plurality of edges in a plurality of graph database objects wherein the plurality of graph database objects includes a first graph database object that stores the plurality of vertices and a second graph database object that stores the plurality of edges;
compiling a query that calls a graph analytics function (GAF) having the particular graph object as an input argument, comprising generating one or more temporary database objects for a cursor of the query;
executing the query during a particular execution of the cursor, comprising:
invoking the GAF over the particular graph object to produce a plurality of GAF-computed values that are temporary and alive during execution of the query,
storing the plurality of GAF-computed values in the one or more temporary database objects, and
utilizing the plurality of GAF-computed values in the one or more temporary database objects to produce a result set for the query that includes at least a portion of the plurality of GAF-computed values; and
returning the result set as a result of the query;
wherein the method is performed by one or more computing devices.

2. The computer-executed method of claim 1, wherein:
a plurality of graph components comprises the plurality of vertices and the plurality of edges; and
each GAF-computed value, of the plurality of GAF-computed values, is a property value for a particular graph component of the plurality of graph components.

3. The computer-executed method of claim 2, wherein each temporary database object, of the one or more temporary database objects:
(a) stores a set of GAF-computed values, of the plurality of GAF-computed values, for one or more graph components of the plurality of graph components, wherein one or more property values for the one or more graph components are stored in a graph database object, of the plurality of graph database objects, that corresponds to said each temporary database object; and
(b) includes foreign key information corresponding to primary key information in the corresponding graph database object.

4. The computer-executed method of claim 2, wherein:
the plurality of graph database objects are represented in main memory, each tuple of which is associated with a tuple unique identifier; and
each temporary database object, of the one or more temporary database objects:

(a) stores a set of GAF-computed values, of the plurality of GAF-computed values, for one or more graph components of the plurality of graph components, wherein one or more property values for the one or more graph components are stored in a graph database object, of the plurality of graph database objects, that corresponds to said each temporary database object; and
(b) includes foreign key information comprising tuple unique identifiers for tuples of a corresponding graph database object.

5. The computer-executed method of claim 1, wherein:
the plurality of graph database objects comprises a plurality of same-type graph database objects storing property values for either: the plurality of vertices, or the plurality of edges;
for each same-type graph database object, of the plurality of same-type graph database objects, the one or more temporary database objects comprise a corresponding temporary database object, corresponding to said each same-type graph database object, that includes primary key information from said each same-type graph database object.

6. The computer-executed method of claim 5, wherein
the plurality of GAF-computed values comprises values for a particular output property stored in a particular temporary database object of the one or more temporary database objects;
the particular temporary database object corresponds to a particular graph database object, of the plurality of graph database objects, that stores values for one or more graph properties of the particular graph object; and
determining that an execution plan of the query requires both: first values of the particular output property, and second values of a particular graph property of the one or more graph properties;
responsive to determining that the execution plan of the query requires both the first values and the second values, performing a join of the particular temporary database object and the particular graph object to produce join results; and
producing the result set of the query based, at least in part, on one or more tuples of the join results.

7. The computer-executed method of claim 1, wherein:
the plurality of GAF-computed values comprises values for a plurality of GAF-computed properties comprising one or more output properties; and
the one or more temporary database objects comprise a temporary database object corresponding to each GAF-computed property of the plurality of GAF-computed properties.

8. The computer-executed method of claim 7, further comprising:
detecting that the query refers to particular one or more output properties of the plurality of GAF-computed properties; and
responsive to detecting that the query refers to the particular one or more output properties, limiting generation of temporary database objects for output properties of the GAF to generating a temporary database object for each output property of the particular one or more output properties.

9. The computer-executed method of claim 7, wherein
detecting that the query refers to particular one or more output properties of the plurality of GAF-computed properties; and responsive to detecting that the query refers to the particular one or more output properties, limiting production of GAF-computed values for output properties of the GAF to producing values for each output property of the particular one or more output properties.

10. The computer-executed method of claim 7, wherein the plurality of GAF-computed properties further comprises one or more temporary properties.

11. The computer-executed method of claim 7, further comprising:
maintaining mapping data that maps each temporary database object, of the one or more temporary database objects, to a corresponding GAF-computed property of the plurality of GAF-computed properties;
determining that an execution plan of the query requires values of a particular GAF-computed property of the plurality of GAF-computed properties;
responsive to determining that the execution plan of the query requires the particular GAF-computed property:
using the mapping data to identify a particular temporary database object, of the one or more temporary database objects, that is mapped to the particular GAF-computed property, and
retrieving the values for the particular GAF-computed property from the particular temporary database object.

12. The computer-executed method of claim 1, wherein:
the plurality of GAF-computed values comprises values for a plurality of GAF-computed properties; and
the one or more temporary database objects comprise a temporary database object storing values for two or more GAF-computed properties of the plurality of GAF-computed properties.

13. The computer-executed method of claim 1, further comprising the DBMS automatically reclaiming storage allocated for the one or more temporary database objects responsive to completion of execution of the particular execution of the cursor.

14. The computer-executed method of claim 1, wherein:
the plurality of GAF-computed values is a first plurality of GAF-computed values; and
a second execution of the cursor of the query, executing concurrently with the particular execution of the cursor, stores a second plurality of GAF-computed values in the one or more temporary database objects.

15. The computer-executed method of claim 14, wherein:
the first plurality of GAF-computed values is private to the particular execution of the cursor; and
the second plurality of GAF-computed values is private to the second execution of the cursor.

16. The computer-executed method of claim 1, further comprising:
maintaining mapping data that maps each temporary database object, of the one or more temporary database objects, to a corresponding graph database object of the plurality of graph database objects;
wherein invoking the GAF based on the particular graph object comprises calling an execute function for the GAF based, at least in part, on the mapping data.

17. The computer-executed method of claim 1, wherein:
the one or more temporary database objects are maintained in memory;
the method further comprises:
detecting that a size of the one or more temporary database objects in memory has exceeded a threshold size, and
responsive to detecting the size of the one or more temporary database objects has exceeded the threshold size, storing at least a portion of the one or more temporary database objects on persistent storage.

18. One or more non-transitory computer readable media storing one or more sequences of instructions that, when executed by one or more processors, cause:
a database management system (DBMS) maintaining a database that stores a particular graph object that defines a plurality of vertices and a plurality of edges in a plurality of graph database objects wherein the plurality of graph database objects includes a first graph database object that stores the plurality of vertices and a second graph database object that stores the plurality of edges;
compiling a query that calls a graph analytics function (GAF) having the particular graph object as an input argument, comprising generating one or more temporary database objects for a cursor of the query;
executing the query during a particular execution of the cursor, comprising:
 invoking the GAF over the particular graph object to produce a plurality of GAF-computed values that are temporary and alive during execution of the query,
 storing the plurality of GAF-computed values in the one or more temporary database objects, and
 utilizing the plurality of GAF-computed values in the one or more temporary database objects to produce a result set for the query that includes at least a portion of the plurality of GAF-computed values; and
returning the result set as a result of the query.

19. The one or more non-transitory computer readable media of claim 18, wherein:
a plurality of graph components comprises the plurality of vertices and the plurality of edges; and
each GAF-computed value, of the plurality of GAF-computed values, is a property value for a particular graph component of the plurality of graph components.

20. The one or more non-transitory computer readable media of claim 18, wherein
each temporary database object, of the one or more temporary database objects:
 (a) stores a set of GAF-computed values, of the plurality of GAF-computed values, for one or more graph components of the plurality of graph components, wherein one or more property values for the one or more graph components are stored in a graph database object, of the plurality of graph database objects, that corresponds to said each temporary database object; and
 (b) includes foreign key information corresponding to primary key information in a corresponding graph database object.

21. The one or more non-transitory computer readable media of claim 19, wherein:
the plurality of graph database objects are represented in main memory, each tuple of which is associated with a tuple unique identifier; and
each temporary database object, of the one or more temporary database objects:
 (a) stores a set of GAF-computed values, of the plurality of GAF-computed values, for one or more graph components of the plurality of graph components, wherein one or more property values for the one or more graph components are stored in a graph database object, of the plurality of graph database objects, that corresponds to said each temporary database object; and
 (b) includes foreign key information comprising tuple unique identifiers for tuples of a corresponding graph database object.

22. The one or more non-transitory computer readable media of claim 18, wherein:
the plurality of graph database objects comprises a plurality of same-type graph database objects storing property values for either: the plurality of vertices, or the plurality of edges;
for each same-type graph database object, of the plurality of same-type graph database objects, the one or more temporary database objects comprise a corresponding temporary database object, corresponding to said each same-type graph database object, that includes primary key information from said each same-type graph database object.

23. The one or more non-transitory computer readable media of claim 22, wherein:
the plurality of GAF-computed values comprises values for a particular output property stored in a particular temporary database object of the one or more temporary database objects;
the particular temporary database object corresponds to a particular graph database object, of the plurality of graph database objects, that stores values for one or more graph properties of the particular graph object; and
the one or more sequences of instructions include instructions that, when executed by one or more processors, cause:
determining that an execution plan of the query requires both: first values of the particular output property, and second values of a particular graph property of the one or more graph properties;
responsive to determining that the execution plan of the query requires both the first values and the second values, performing a join of the particular temporary database object and the particular graph object to produce join results; and
producing the result set of the query based, at least in part, on one or more tuples of the join results.

24. The one or more non-transitory computer readable media of claim 18, wherein:
the plurality of GAF-computed values comprises values for a plurality of GAF-computed properties comprising one or more output properties; and
the one or more temporary database objects comprise a temporary database object corresponding to each GAF-computed property of the plurality of GAF-computed properties.

25. The one or more non-transitory computer readable media of claim 24, wherein the one or more sequences of instructions include instructions that, when executed by one or more processors, cause:
detecting that the query refers to particular one or more output properties of the plurality of GAF-computed properties; and
responsive to detecting that the query refers to the particular one or more output properties, limiting generation of temporary database objects for output properties of the GAF to generating a temporary database object for each output property of the particular one or more output properties.

26. The one or more non-transitory computer readable media of claim 24, wherein the one or more sequences of instructions include instructions that, when executed by one or more processors, cause:

detecting that the query refers to particular one or more output properties of the plurality of GAF-computed properties; and responsive to detecting that the query refers to the particular one or more output properties, limiting production of GAF-computed values for output properties of the GAF to producing values for each output property of the particular one or more output properties.

27. The one or more non-transitory computer readable media of claim 24, wherein the plurality of GAF-computed properties further comprises one or more temporary properties.

28. The one or more non-transitory computer readable media of claim 24, wherein the one or more sequences of instructions include instructions that, when executed by one or more processors, cause:

maintaining mapping data that maps each temporary database object, of the one or more temporary database objects, to a corresponding GAF-computed property of the plurality of GAF-computed properties;

determining that an execution plan of the query requires values of a particular GAF-computed property of the plurality of GAF-computed properties;

responsive to determining that the execution plan of the query requires the particular GAF-computed property:

using the mapping data to identify a particular temporary database object, of the one or more temporary database objects, that is mapped to the particular GAF-computed property, and retrieving the values for the particular GAF-computed property from the particular temporary database object.

29. The one or more non-transitory computer readable media of claim 18, wherein:

the plurality of GAF-computed values comprises values for a plurality of GAF-computed properties; and the one or more temporary database objects comprise a temporary database object storing values for two or more GAF-computed properties of the plurality of GAF-computed properties.

30. The one or more non-transitory computer readable media of claim 18, wherein the one or more sequences of instructions include instructions that, when executed by one or more processors, cause the DBMS automatically reclaiming storage allocated for the one or more temporary database objects responsive to completion of execution of the particular execution of the cursor.

31. The one or more non-transitory computer readable media of claim 18, wherein:

the plurality of GAF-computed values is a first plurality of GAF-computed values; and the one or more sequences of instructions include instructions that, when executed by one or more processors, cause a second execution of the cursor of the query, executing concurrently with the particular execution of the cursor, storing a second plurality of GAF-computed values in the one or more temporary database objects.

32. The one or more non-transitory computer readable media of claim 31, wherein:

the first plurality of GAF-computed values is private to the particular execution of the cursor; and the second plurality of GAF-computed values is private to the second execution of the cursor.

33. The one or more non-transitory computer readable media of claim 18, wherein the one or more sequences of instructions include instructions that, when executed by one or more processors, cause:

maintaining mapping data that maps each temporary database object, of the one or more temporary database objects, to a corresponding graph database object of the plurality of graph database objects;

wherein invoking the GAF based on the particular graph object comprises calling an execute function for the GAF based, at least in part, on the mapping data.

34. The one or more non-transitory computer readable media of claim 18, wherein:

the one or more temporary database objects are maintained in memory;

the one or more sequences of instructions include instructions that, when executed by one or more processors, cause:

detecting that a size of the one or more temporary database objects in memory has exceeded a threshold size, and responsive to detecting the size of the one or more temporary database objects has exceeded the threshold size, storing at least a portion of the one or more temporary database objects on persistent storage.

* * * * *

UNITED STATES PATENT AND TRADEMARK OFFICE
CERTIFICATE OF CORRECTION

Page 1 of 1

PATENT NO. : 12,124,448 B2
APPLICATION NO. : 17/585146
DATED : October 22, 2024
INVENTOR(S) : Kapp et al.

It is certified that error appears in the above-identified patent and that said Letters Patent is hereby corrected as shown below:

In the Specification

In Column 29, Line 35, delete "and or" and insert -- and/or --, therefor.

In the Claims

In Column 36, Line 60, in Claim 3, delete "the" and insert -- a --, therefor.

Signed and Sealed this
Fourth Day of February, 2025

Coke Morgan Stewart
*Acting Director of the United States Patent and Trademark Office*